US012681641B2

(12) United States Patent
Li et al.

(10) Patent No.: US 12,681,641 B2
(45) Date of Patent: Jul. 14, 2026

(54) INCREASING OLTP THROUGHPUT BY IMPROVING THE PERFORMANCE OF LOGGING USING PERSISTENT MEMORY STORAGE

(71) Applicant: Oracle International Corporation, Redwood Shores, CA (US)

(72) Inventors: Yunrui Li, Fremont, CA (US); Graham Ivey, Hook (GB); Shampa Chakravarty, Pleasant Hill, CA (US); Vsevolod Panteleenko, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 11 days.

(21) Appl. No.: 18/929,241

(22) Filed: Oct. 28, 2024

(65) Prior Publication Data

US 2025/0053299 A1 Feb. 13, 2025

Related U.S. Application Data

(62) Division of application No. 17/880,446, filed on Aug. 3, 2022, now Pat. No. 12,159,032.

(51) Int. Cl.
*G06F 3/06* (2006.01)
(52) U.S. Cl.
CPC ............ *G06F 3/061* (2013.01); *G06F 3/0646* (2013.01); *G06F 3/0683* (2013.01)
(58) Field of Classification Search
None
See application file for complete search history.

(56) References Cited

U.S. PATENT DOCUMENTS

| | | |
|---|---|---|
| 6,976,022 B2 | 12/2005 | Vemuri et al. |
| 9,563,521 B2 | 2/2017 | Panteleenko et al. |
| 10,599,630 B2 | 3/2020 | Li |
| 10,732,836 B2 | 8/2020 | Shi et al. |

(Continued)

OTHER PUBLICATIONS

Haubenschild, Michael, et al., "Rethinking Logging, Checkpoints, and Recovery for High-Performance Storage Engines", Proceedings of the 2020 ACM SIGMOD Intl Conf on Mgmt of Data (SIGMOD'20), https://doi.org/10.1145/3318464.3389716, Jun. 11, 2020, 16pgs.

*Primary Examiner* — Scott C Sun
(74) *Attorney, Agent, or Firm* — Hickman Becker Bingham Ledesma LLP

(57) ABSTRACT

In an embodiment, before modifying a persistent ORL (ORL), a database management system (DBMS) persists redo for a transaction and acknowledges that the transaction is committed. Later, the redo is appended onto the ORL. The DBMS stores first redo for a first transaction into a first PRB and second redo for a second transaction into a second PRB. Later, both redo are appended onto an ORL. The DBMS stores redo of first transactions in volatile SRBs (SLBs) respectively of database sessions. That redo is stored in a volatile shared buffer that is shared by the database sessions. Redo of second transactions is stored in the volatile shared buffer, but not in the SLBs. During re-silvering and recovery, the DBMS retrieves redo from fast persistent storage and then appends the redo onto an ORL in slow persistent storage. After re-silvering, during recovery, the redo from the ORL is applied to a persistent database block.

18 Claims, 14 Drawing Sheets

(56)     References Cited

U.S. PATENT DOCUMENTS

| 11,061,884 | B2 | 7/2021 | Li | |
| 2020/0125656 | A1 | 4/2020 | Li | |
| 2021/0073198 | A1* | 3/2021 | Srinivasan | .......... G06F 11/1471 |
| 2022/0147404 | A1 | 5/2022 | Zheng | |

* cited by examiner

201 Persist redo for transaction by flushing session redo buffer to persistent redo buffer143

202 Acknowledge that transaction is committed

203 Append change entry onto persistent online redo log

204 Append second change entry onto persistent online redo log

205 Retain second change entry in session buffer or persistent buffer

FIG. 4

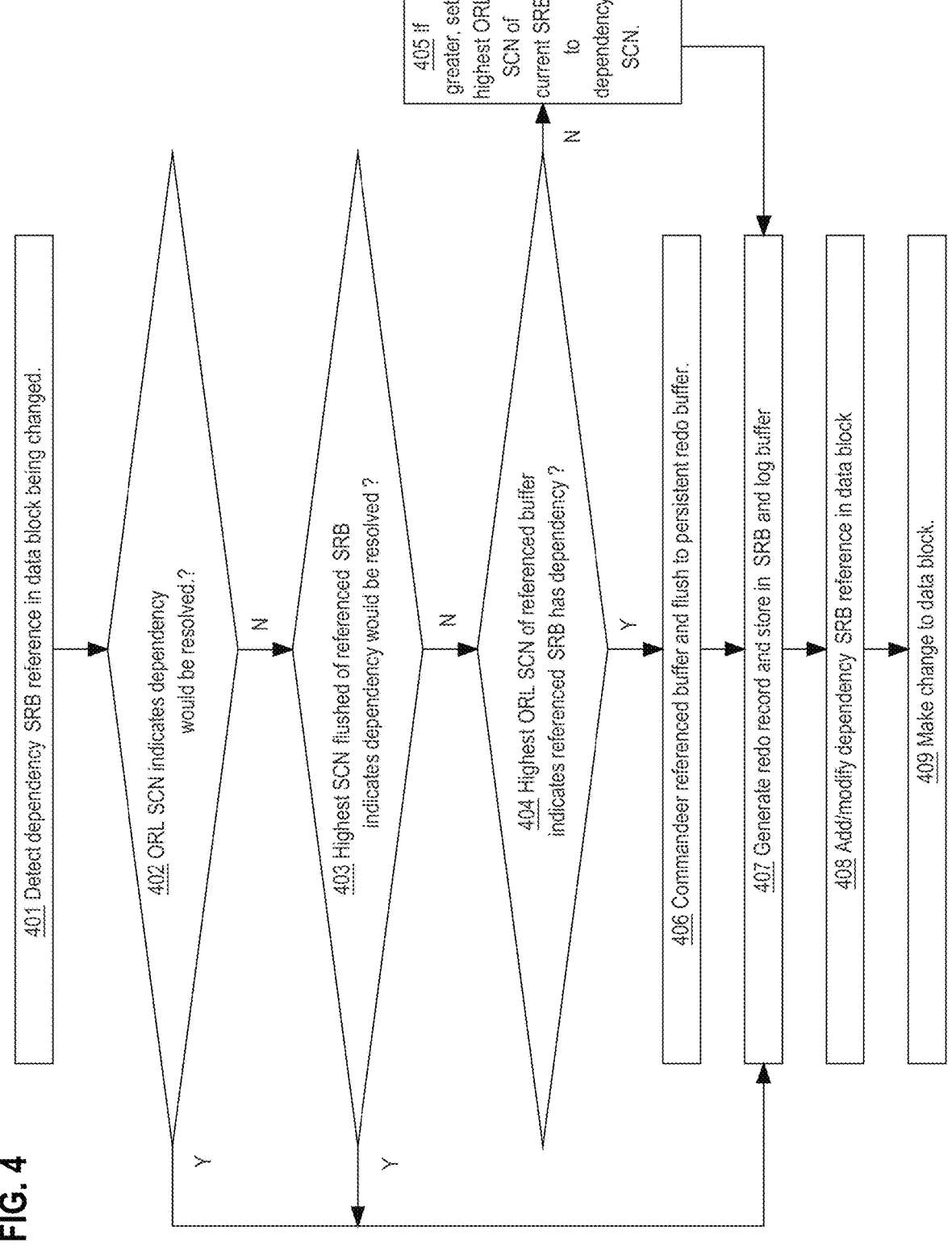

401 Detect dependency SRB reference in data block being changed.

402 ORL SCN indicates dependency would be resolved ?

403 Highest SCN flushed of referenced SRB indicates dependency would be resolved ?

404 Highest ORL SCN of referenced buffer indicates referenced SRB has dependency ?

405 If greater, set highest ORL SCN of current SRB to dependency SCN.

406 Commandeer referenced buffer and flush to persistent redo buffer.

407 Generate redo record and store in SRB and log buffer

408 Add/modify dependency SRB reference in data block

409 Make change to data block.

701 Detect that second change entry is contained in both fast persistent storage and online redo log 702 Retrieve first change entry from fast persistent storage 703 Append first change entry onto online redo log in slow persistent storage 704 To persistent data block, apply first change entry from online redo log 801 Retrieve first incarnation number from persistent storage in first computer 802 Retrieve second incarnation number from persistent storage in second computer 803 Detect that second incarnation number is higher than first incarnation number 901 Append change entries of first transactions onto session buffers 902 Append change entries of first transactions onto shared buffer 903 Append change entries of second transactions onto shared buffer but not onto session buffers

FIG. 10

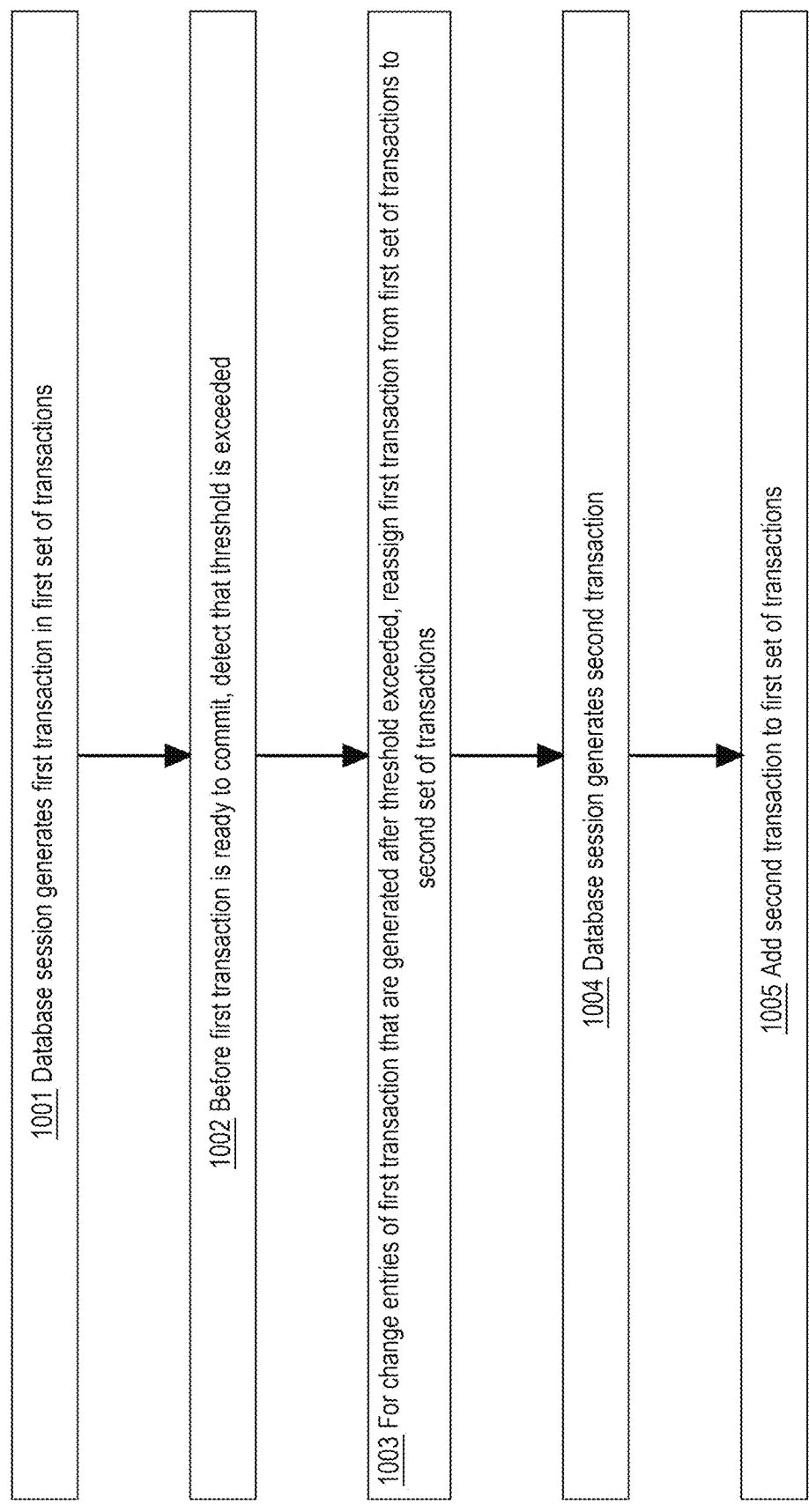

1001 Database session generates first transaction in first set of transactions

1002 Before first transaction is ready to commit, detect that threshold is exceeded 1003 For change entries of first transaction that are generated after threshold exceeded, reassign first transaction from first set of transactions to second set of transactions 1004 Database session generates second transaction 1005 Add second transaction to first set of transactions 1101 Transaction in session buffer on depends on change record of other transaction ?

YES

1102 Other transaction does not use session buffer for change record ?

YES

1103 Change record was already appended onto persistent online redo log ?

NO

1104 Flush change record to persistent online redo log

SOFTWARE SYSTEM 1400

APPLICATION PROGRAM 1 — 1402A

APPLICATION PROGRAM 2 — 1402B

APPLICATION PROGRAM 3 — 1402C

[...]

APPLICATION PROGRAM N — 1402N

1402

OPERATING SYSTEM
(e.g., WINDOWS, UNIX, LINUX, MAC OS, IOS, ANDROID, OR LIKE)

GRAPHICAL USER INTERFACE (GUI) — 1415

1410

VIRTUAL MACHINE MONITOR (VMM) — 1430

BARE HARDWARE (e.g., COMPUTING DEVICE 1300)

INCREASING OLTP THROUGHPUT BY IMPROVING THE PERFORMANCE OF LOGGING USING PERSISTENT MEMORY STORAGE

BENEFIT CLAIM

This application claims the benefit as a divisional of application Ser. No. 17/880,446, filed Aug. 3, 2022, by Li et al., the entire contents of which is incorporated by reference. The applicant hereby rescinds any disclaimer of claim scope in the parent applications or the prosecution history thereof and advise the USPTO that the claims in this application may be broader than any claim in the parent application.

FIELD OF THE DISCLOSURE

This disclosure relates to accelerated write-ahead logging (WAL). Presented herein are techniques for persistent redo buffering before appending data onto an online redo log (ORL).

BACKGROUND

A common approach to transaction logging in databases is to use write ahead logging (WAL). By guaranteeing that no changes are made to disk before the corresponding redo are written, WAL ensures the atomicity and durability components of the ACID (atomic consistent isolated durable) transaction properties needed in database systems. WAL facilitates high-performance database systems by providing in-place updates and eliminating a need to flush modified data pages to disk at each transaction commit.

However, state of the art WAL introduces latency during transaction commit, because the committing processes must wait for the log writer to complete, which is referred to as log file sync. Online transaction processing (OLTP) throughput in a database system is largely affected by the performance of logging of redo. Specifically, a transaction should wait for its redo to be persisted when the transaction commits, and this latency decreases throughput.

Persistent memory (PMEM) can be written at nearly dynamic random access memory (DRAM) speeds but, unlike DRAM, PMEM has the advantage of persistence. Replacing the disk or flash storage on which the redo log is stored, with PMEM, helps reduce the impact of log file sync, but that solution has some drawbacks. With PMEM storage, writes are quick, and a correspondingly short sleep time is needed by an OLTP database session to wait in the foreground for log file sync.

Aaccurately programming such short sleep times is difficult because the state of the art lacks a fine granularity needed for short sleeping. The cost, of the over-sleeping caused by insufficient granularity of sleep time resolution, is high relative to the short duration of the required sleep. Additionally, there is task switching latency for a committing OLTP process to awaken from a sleep and become runnable by the operating system. Task switching latency increases with the load on the system thus making the duration of the sleep difficult to control.

BRIEF DESCRIPTION OF THE DRAWINGS

In the drawings:

FIG. 4 is a flow diagram that depicts an example procedure for early flushing performed by a database session while executing a transaction that modifies a data block in a data block buffer;

FIG. 10 is a flow diagram that depicts an example computer process that a DBMS may perform to opportunistically switch an uncommitted transaction that was using a session redo buffer to instead use only a shared buffer for the remainder of the transaction;

FIG. 11 is a flow diagram that depicts an example computer process that a database session may perform to persist a first transaction that a second transaction depends on;

DETAILED DESCRIPTION

Figure 1:
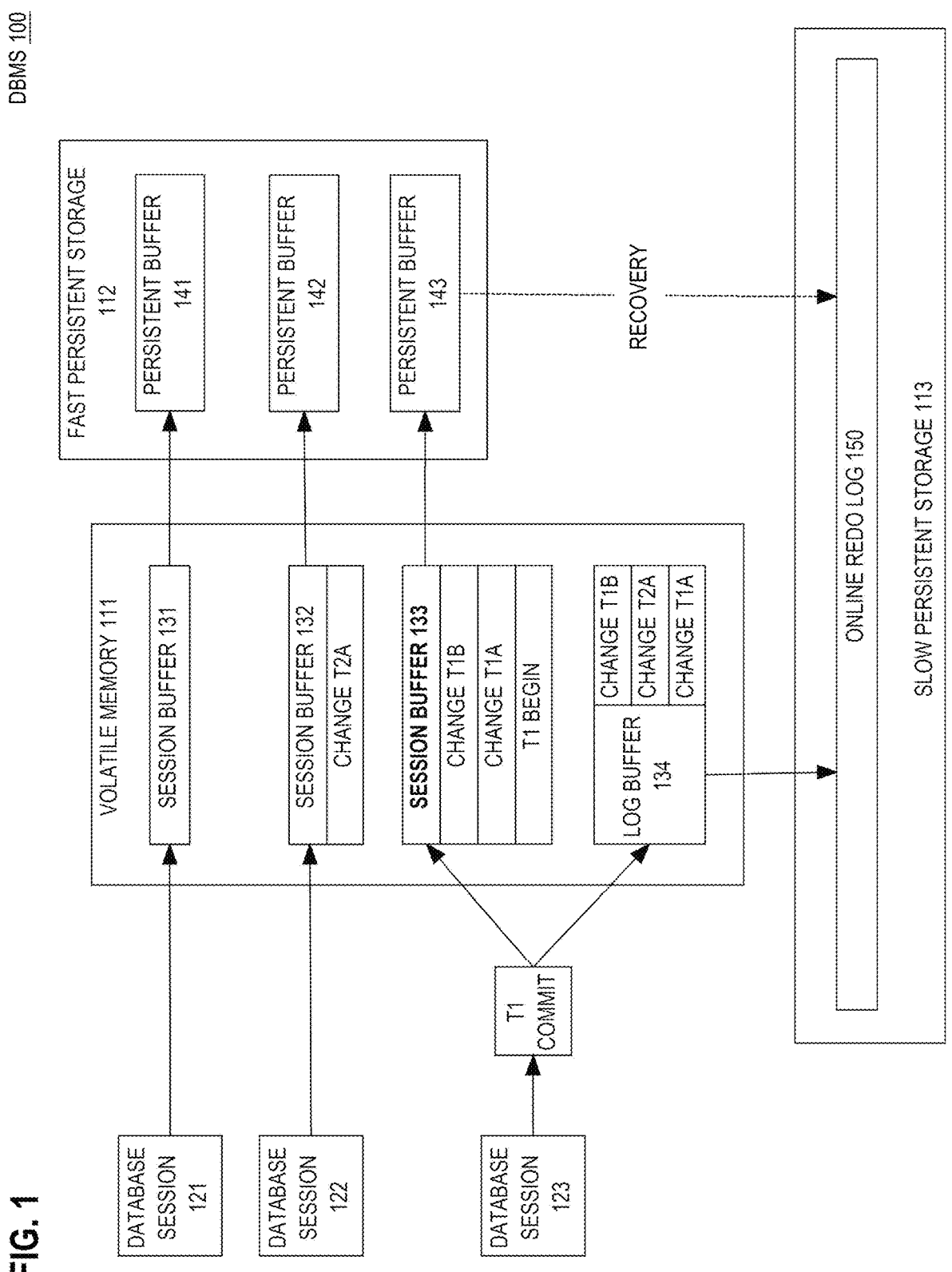
FIG. 1 is a block diagram that depicts an example database management system (DBMS) that accelerates write ahead logging (WAL) with persistent redo buffering before appending data onto an online redo log (ORL)

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is accelerated write ahead logging (WAL) with persistenting redo records in persistent memory (PMEM) before appending data onto an online redo log (ORL). Presented techniques take advantage of PMEM in order to eliminate transaction commit latency in most cases, thereby maximizing online transaction processing (OLTP) throughput. Log file sync latency and sleeping that it would necessitate are avoided, and commit latency may only arise from time spent writing redo to PMEM.

This approach uses PMEM as ancillary storage to separately persist redo in a set of "persistent redo buffers" (PRB) in PMEM that supplement a redo log. A set of one or more redo records may be referred to herein as simply redo. Generation of redo by a database session continues to use the existing logging model such that a database session adds its own redo, one-by-one as they are generated, into a shared system-wide dynamic random access memory (DRAM)-based log buffer, the contents of which are periodically gathered by a system process such as a log writer that persists these redo to the redo log in a global ordering. Additionally, the database session accumulates its redo in a DRAM-based session-private session redo buffer (SRB). The SRB by itself does not maintain a global ordering of interleaved redo of concurrent transactions generated by other database sessions.

When a transaction of the database session is ready to commit, the redo that has been accumulated in the SRB (including a redo record referred to as a commit record) may be synchronously persisted to a PRB in PMEM by the database session itself. In an embodiment, a PRB may reside in remote PMEM. Persisting redo entails remote direct memory access (RDMA) to the PMEM. This access is very quick and, because this work is not done by a central processing unit (CPU), the process of the database session does not sleep (from an operating system perspective) during RDMA. When an RDMA completes, redo written by the database session is persistent so that a committed transaction is durable and the database session is free to immediately continue processing. Eventually, the log writer may also persist the copies of the same redo, including the commit record, in the redo log during a log file sync, but the database session need not wait for the log file sync because the redo for the database session already is persisted in the PRB.

Architecturally, the redo log does not change. This feature may be an important factor in a complex database management system (DBMS) with many mature components that rely on the redo log.

When a database is recovering from a crash, the redo in the PRBs is used for re-silvering the redo log to ensure that the redo log is rehabilitated to a consistent state for recovery. Re-silvering takes redo that is found in the PRBs that has not yet been persisted in the redo log and writes the redo to the redo log. In this way, a complete log, including redo that would otherwise have been missing from the redo log, can be presented to recovery (and to any other log clients that also expect a completed log).

In this approach, the PMEM-based PRBs serve as an adjunct to logging for accelerated commits that avoid log file sync, which decreases transaction commit latency and increases DBMS throughput. The result is acceleration and increased reliability in a DBMS.

3.0 Example Database Management System (DBMS)

FIG. 1 is a block diagram that depicts an example database management system (DBMS) 100 that accelerates write ahead logging (WAL) with persistent redo buffering before appending data onto an online redo log (ORL). DBMS 100 is hosted on one or more computers that may each be a rack server such as a blade, a mainframe, a virtual machine, or other computing device.

DBMS 100 operates one or more databases such as a relational database that contains a relational schema, a database dictionary, and relational tables consisting of rows and columns stored in row major or columnar (i.e. column major) format in files that may consist of database blocks that each contain one or more rows.

DBMS 100 stores redo generated for transactions in online redo log (ORL) 150, which DBMS 100 uses for WAL. By design, persistently writing a redo record for a change to ORL 150 is faster than writing the change to the database. For example, the database may reside in a slower storage tier than slow persistent storage 113 that contains ORL 150. Alternatively, the database may reside in slow persistent storage 113, and DBMS 100 may prioritize writes to ORL150 over writes to the database.

In an embodiment, slow persistent storage 113 is a flash solid state drive (SSD), and the database resides in a disk drive or network attached storage (NAS). In an embodiment, slow persistent storage 113 is a disk drive, and the database resides in NAS.

Database data in DBMS 100 is stored in data blocks in persistent storage. Database data is changed by first reading the data blocks from persistent storage 113 into in-memory buffers of the DBMS, modifying the data blocks in the buffers, and then rewriting the modified data blocks to persistent storage 113. The buffers are referred to herein as data block buffers. A copy of a data block stored in a data block buffer may be referred to as buffered data block. Redo is generated when modifying a buffered data block.

Because ORL 150 resides in slow persistent storage 113, an ACID transaction is durable if the transaction's changes to data blocks are recorded in redo stored in ORL 150, even if the changed data blocks have not been persistently written to the database. Latency of the transaction is decreased if the transaction is acknowledged as committed when all of the transaction's changes have been recorded in redo stored in ORL 150, which may be before the transaction's changes are persistently written to the database.

3.0 Storage Media Hierarchy

DBMS 100 has a hierarchy of storage tiers 111-113 of different speeds and capacities. Speed and capacity are somewhat mutually exclusive such that more speed means less capacity or vice versa. Volatile memory 111 has the most speed and the least capacity. Slow persistent storage 113 has the most capacity and the least speed.

The speed and capacity of fast persistent storage 112 are between those of storage tiers 111 and 113. In a preferred embodiment, fast persistent storage 112 is byte-addressable persistent memory (PMEM), and slow persistent storage 113 is a flash solid state drive (SSD), or a disk drive. In an embodiment, fast persistent storage 112 is an SSD, and slow persistent storage 113 is a disk drive.

1.2 Volatile Buffering Of Redo Records

Volatile memory 111 cannot provide ACID durability, but log buffer 134 in volatile memory 111 can provide further acceleration in ways somewhat similar or complementary to those of ORL 150. For example, respective redo records for changes T1A and T1B of transaction T1 and change T2A of transaction T2 may be stored into log buffer 134 at three different respective times and then flushed together from log buffer 134 into ORL 150 in a single write. Thus, three writes to ORL 150 that would have been needed for three separate redo records are replaced by only one write, which increases throughput.

Each of changes T1A, T1B, T2A, T1-begin and T1-commit is a redo record. Each of changes T1A, T1B, and T2A specify a result of a create read update delete (CRUD) operation on a single table row or database block. For example, change T1A may contain a row identifier (ROWID) or a logical block address (LBA), and may contain a byte offset or a field/column identifier, and may contain a new value to be written. Changes T1-begin and T1-commit demark transaction T1 that is a sequence of changes.

1.3 Transaction Lifecycle

The lifecycle of a transaction is a sequence of three phases. For example, the first phase of transaction T1 is uncommitted (also referred to herein as unready to commit), which entails generation and volatile buffering of changes T1-begin, T1A, and T1B in log buffer 134. The second phase is committing (also referred to herein as ready to commit) that entails generation and volatile buffering of T1-commit. The third phase is committed that entails persistence of all changes of the transaction, regardless of whether or not the transaction's changes are written to the database.

As explained later herein, the phased lifecycle of a transaction may be a logical pipeline of stages such that for various reasons different subsequences of changes in the transaction may simultaneously be in different respective stages of the pipeline (and different phases of the lifecycle). For example, simultaneously: a) change T1A may have already been applied to the database, b) ORL 150 may contain change T1B, and c) log buffer 134 may contain change T1-commit. In that case, the transaction itself remains in the second phase (committing) because change T1-commit is not yet persisted.

1.4 SRBS for Concurrent Database Sessions

Herein are two synergistic accelerations based on concurrent multiple transactions and fast persistent storage 112. Log buffer 134 is a shared buffer. Because log buffer 134 is shared by potentially all transactions that are not yet fully committed (i.e. uncommitted or committing), log buffer 134 is prone to contention by concurrent transactions. Consistency of log buffer 134 may require thread safety that uses mutual exclusion to serialize contending threads. Serialization may cause some transactions to stall or starve and may cause priority inversion when a high priority transaction waits for low priority transaction(s) to finish appending redo record(s) onto log buffer 134.

Without sacrificing thread safety, serialization is avoided by use of SRBs 131-133 in volatile memory 111. Each database session of database sessions 121-123 executing an uncommitted transaction temporarily obtains and uses a single SRB for the transaction in which to accumulate redo generated for executing an uncommitted transaction. For example, each of database sessions 121-123 may correspond to a respective client that sends DML statements to DBMS 100 through respective database sessions 121-123. Database sessions 121-123 may concurrently: a) execute respective DML statements within respective transactions, and b) exclusively operate respective SRBs 131-133 without contention to store redo generated for those transactions.

For storing redo, using SRB 131 is faster than only using log buffer 134 for various reasons. First, contentious waiting between multiple database sessions does not occur. Second, based on PRBs 141-143 in fast persistent storage 112 as explained later herein, a SRB does not have producers and a consumer that could cause contention, unlike log buffer 134.

For example, a database session is a producer that may race to append a change onto log buffer 134 while a controller of log buffer 134 is a consumer that may simultaneously race to flush log buffer 134 to ORL 150. Producer/consumer contention may require synchronization overhead for thread safety. In an embodiment, a producer or consumer is a thread. In an embodiment, a controller of log buffer 134 or of ORL 150 is a consumer and a thread.

Third, because use of SRB 131 avoids multi-session contention and producer/consumer contention, SRB 131 reduces overhead of serialization for thread safety with a mutual exclusion (mutex) lock, critical section, or a memory fence/barrier. Use of SRBs 131-133 avoids producer/consumer contention, which is achieved by combining the responsibilities of a producer and a consumer into a same thread, which is inherently thread safe. For example, as a producer, database session 123 appends redo by transaction T1 onto SRB 133 and, when transaction T1 commits, database session 123 flushes redo from SRB 133 to PRB 143.

1.5 PRBs

SRBs 131-133 are independently flushed by database sessions 121-123 to respective PRBs 141-143. SRBs are flushed in this way to commit a transaction and at other times described herein.

In an embodiment, SRB 131 is dissociated from database session 121 and returned to a pool of unused SRBs when SRB 131 is emptied by flushing. When a database session needs a SRB for storing generated redo, a database session may take an unused SRB from the pool.

While the SRB is used by a database session to store redo records generated by a transaction executed by the database session, the SRB is referred to as the database session's current redo buffer. A SRB may be used by multiple database sessions, one at-a-time, to store redo generated for transactions executed by the database sessions.

In an embodiment, database session 121 may "steal" an empty SRB from another database session. For example, database session 121 may need a SRB because its previous SRB was empty and stolen. In an embodiment, database session 121 may steal a non-empty SRB from another database session so long as database session 121 flushes the stolen SRB to a respective PRB before appending changes onto the stolen SRB.

If a database session needs a SRB and the pool is empty and/or there is no empty SRB to steal, then database session 121 waits until a SRB becomes available. In this way, there may be more concurrent database sessions than SRBs, and more concurrent transactions than SRBs. In an embodiment, if a database session waits for a threshold duration without obtaining or stealing a needed SRB, then the database session temporarily resorts to storing redo only in log buffer 134 as discussed later herein, in which case the transaction should not be acknowledged as committed until log buffer 134 is flushed to ORL 150 as discussed below.

In an embodiment, regardless of whether SRB 131 is assigned to database session 121 or reassigned to another database session, or unassigned in the pool, there is always a fixed one-to-one association between SRBs 131-133 and PRBs 141-143. For example, regardless of which database session SRB 131 is assigned, SRB 131 is always flushed to PRB 141, and SRBs 132-133 is never flushed to PRB 141.

Consequences of SRB reassignment among database sessions are as follows. PRB 141 may contain redo of multiple transactions by the same or different database sessions. Likewise, redo records of different transactions by database session 121 may reside in the same or different respective PRBs of PRBs 141-143. In any case, redo records of a same transaction are never divided between multiple of PRBs 141-143. In an embodiment, database session 121 selects a SRB to steal or acquire from a pool based on which SRB is associated with a PRB that has the most unused capacity or has at least a threshold amount of unused capacity.

1.6 Log File Sync

In an embodiment discussed below, flushing of log buffer 134 is asynchronous (i.e. by a separate consumer), and log buffer 134 is decoupled from ORL 150. In an embodiment, capacity of ORL 150 is practically unbounded, such as bounded only by the capacity of slow persistent storage 113.

In an embodiment, capacities of SRBs 131-134 and PRBs 141-143 are bounded. For example, the size of each of SRBs 131-133 may be 64 kilobytes, and the size of each of PRBs 141-143 may be eight times as large, such as half a megabyte. In an embodiment, SRBs 131-134 reside in a volatile system global area (SGA) of DBMS 100.

Overflow of any of SRBs 131-133 or PRBs 141-143 does not stop transaction execution by database sessions 121-123, because a database session will instead discontinue using any of these buffers and resort to using only log buffer 134.

A transaction is acknowledged as committed when all of the transaction's changes have been stored in one of PRBs 141-143 or in ORL 150. In an embodiment, a COMMIT statement for a transaction may specify WAIT (i.e. synchronous) or NOWAIT (i.e. asynchronous). In an embodiment, WAIT synchronously flushes log buffer 134, and NOWAIT instead asynchronously flushes log buffer 134.

In the state of the art, WAIT is much slower than NOWAIT because WAIT would not acknowledge the commit until all of the transaction's redo records, including the commit entry, have been appended onto contentious ORL 150 in slow persistent storage 113. With innovations herein, WAIT is almost as fast as NOWAIT because an uncontentious buffer in fast persistent storage 112 instead provides transaction durability. In an embodiment, WAIT asynchronously flushes log buffer 134 after a transaction's commit synchronously flushes the transaction's SRB.

Synchronously flushing a SRB is faster than asynchronously flushing shared buffer 133 for several reasons including, lack of producer/consumer contention, lack of serialization overhead, and decreased or eliminated input/output waiting (IOWAIT) as discussed earlier herein because fast persistent storage 112 is faster than slow persistent storage 113. For example, PMEM never incurs IOWAIT. PMEM may be part of user space in virtual memory, which accelerates by avoiding an operating system call to access PMEM in a way that would entail a time-expensive switch temporarily from user mode to kernel mode of the operating system.

1.7 Redundant Volatile Buffering

In an embodiment, duplicates of some or all redo records are stored in both a SRB and log buffer 134. For example, database session 123 stores change T1-commit in both of SRB 133 and log buffer 134.

In an embodiment, storing change T1-commit in SRB 133 causes synchronous flushing of SRB 133 but does not cause synchronous flushing of log buffer 134. A SRB can simultaneously contain redo of only one transaction, and log buffer 134 can simultaneously contain redo records of multiple transactions and of multiple database sessions.

During normal OLTP operation of DBMS 100, PRBs 141-143 operate as data sinks and never flush. The normal fate of a redo record in a PRB is to expire in the PRB without ever being flushed from PRB to ORL 150. The dashed arrow from PRB 143 to ORL 150 indicates that PRB 143 is only flushed during recovery after a crash of DBMS 100, which is not normal operation. Recovery and tracking expiry of redo change records in PRBs 141-143 are also discussed later herein.

A redo record in a PRB expires when the redo record is flushed from log buffer 134 to ORL 150. A PRB may be circular so that appending can overwrite expired redo, and PRB cannot overflow with expired redo. In an embodiment, all redo in any of PRBs 141-143 expire when log buffer 134 is eventually completely flushed.

1.8 Global Ordering

The various accelerations with uncontentious buffers 131-133 and 141-143 discussed earlier herein are gained by sacrificing serialization and global ordering of redo records that ORL 150 would otherwise have provided. In an embodiment, DBMS 100 generally assigns each redo record a monotonically increasing timestamp or a system change number (SCN). The global ordering of redo records in a log buffer 134 requires that for any given redo record stored in ORL 150, any redo record having an earlier SCN is stored in the ORL 150. In addition, the redo records are stored or otherwise accessible in SCN order.

2.0 Write Ahead Logging (WAL) Process

Figure 2:
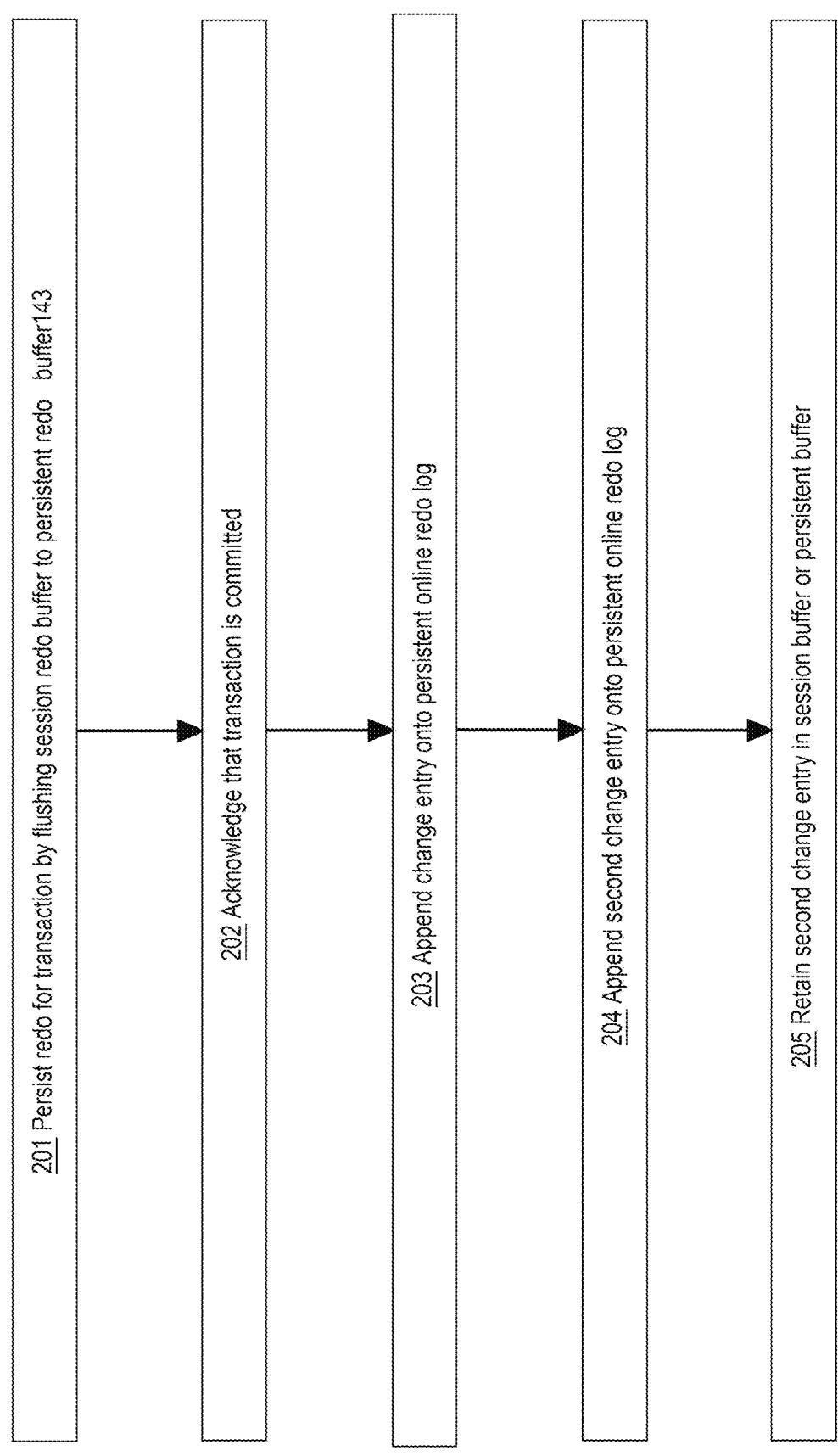
FIG. 2 is a flow diagram that depicts an example computer process that a DBMS may perform to accelerate WAL with buffering in fast persistent storage before appending redo records onto a ORL.

FIG. 2 is a flow diagram that depicts an example computer process that DBMS 100 may perform to accelerate write ahead logging (WAL) with buffering in fast persistent storage 112 before appending redo onto ORL 150, in an embodiment. FIG. 2 is discussed with reference to FIG. 1.

Steps 201-202 are accelerated because they can occur without appending onto ORL 150. Appending redo of transaction T1 onto SRB 133 causes step 201. Depending on the embodiment, a redo record is appended onto log buffer 134 before or after the redo record is appended onto SRB 133.

Step 201 flushes SRB 133 to PRB 143, which is caused by change T1-commit being appended onto SRB 133. In an embodiment, fast persistent storage 112 is PMEM, and flushing SRB 133 is accelerated and implemented by a single memory operation such as memcpy( ) or block transfer (BLT). In an embodiment, appending change T1-commit onto log buffer 134 entails requesting that log buffer 134 be asynchronously flushed in the background, and that asynchronous flushing is deferred until step 203.

Step 202 acknowledges that transaction T1 is committed because step 201 persisted change T1-commit in PRB 143, even though change T1-commit has not yet been flushed from log buffer 134 to ORL 150.

Step 201 demonstrates persisting one transaction. Even though step 202 acknowledged that transaction T1 was committed, some or all of the redo records of transaction T1 may still be retained in log buffer 134 after step 202. Eventually the controller of log buffer 134 asynchronously flushes log buffer 134, including some or all redo records of transaction T1 including change T1-commit in step 203. Even though step 203 flushes transaction T1 from log buffer 134 onto ORL 150, some or all redo records of transaction T1 may still be retained in PRB 143 after step 203 and after the redo recorded are expired as discussed later herein.

Thus, redo records may be appended onto ORL 150 and yet be retained in any of PRBs 141-143. Steps 204-205 demonstrate an optional scenario in which a redo record that was appended onto ORL 150 may still be retained in either a SRB or one of PRBs 141-143. Steps 203-204 may be combined as a single flush of log buffer 134 and, within that single flush, steps 203-204 append different respective redo record(s) onto ORL 150.

Specifically, step 203 appends redo record(s) of transaction T1 as discussed above, and step 204 appends redo record(s) of uncommitted transaction T2. Transactions T1-T2 are generated by database sessions 122-123, respectively. For example as shown in FIG. 1, log buffer 134 contains redo records of both transactions T1-T2, and the single flush of log buffer 134 flushes redo records of both transactions T1-T2.

In various scenarios, step 205 retains some redo records of uncommitted transaction T2 in SRB 132 and/or some other unexpired redo records of uncommitted transaction T2 in PRB 142, even though any of those redo records were already appended onto ORL 150 by step 204. Thus, ORL 150 may contain redo records of a transaction that is unready to commit, because log buffer 134 may have been flushed by a different transaction of a different database session per step 203.

3.0 Redo Dependency

An important safeguard provided by global ordering of redo in ORL 150 is that redo dependencies are inherently resolved. To understand why this important, it is necessary to understand what a redo record dependency is, how a redo dependency is resolved, and why resolving a redo dependency is important.

As the term redo dependency is used herein, a redo dependency exists upon a first redo record for a second redo record when both redo records record successive changes to the same data block and the second redo record records the later of the successive changes. For example, a redo record A with SCN 1000 records a change to a data block and a redo record B record with SCN 1003 records a subsequent and successive change to the same data block. Redo record B has a redo dependency on redo record A. A redo record that is dependent on (i.e. has a redo dependency on) another redo record has later SCN than the other redo record.

A redo dependency may be referred to herein as a dependency. With respect to a dependency and a second redo record that has the dependency on a first record, the second redo record is referred to as the dependent record and the first redo record is referred to as the antecedent record. For example, dependent record B has a dependency on antecedent record A.

A dependency between a pair of redo records is resolved when the antecedent redo record is persisted in a way that makes it later available for recovery. For example, the dependency that redo record B has on redo record A is resolved when a database session stores redo record A in PRB 143 or ORL 150. When the term "redo" or its equivalent is the direct object in a sentence of the term "persist", persist is being used herein to refer to storing a redo record in either a persistent session buffer or a ORL, or other persistent memory in a way that makes the redo record available for recovery. For example, persisting redo record A refers to storing record A in either a PRB or ORL 150.

It is essential to durability and recovery of a database that before a redo record is persisted that, if the particular redo record has a dependency, that the dependency be resolved before persisting the redo record. Specifically, recovering a database entails applying redo records to a past state of the database, such as a backup of the database. To recover a data block, the set of redo records that need to be applied to the data block are those for the changes to the data block that occurred after the past state was created. To recover the data block using the set of redo records, recovery of the data block requires applying the set of redo records in the order of their respective SCNs, in other words, in the order the respective changes were made to the data block. Consequently, an antecedent record must be applied to the data block before the respective dependent record is applied. If a dependent redo record is persisted but the respective antecedent record is not, the antecedent record is not available to be applied to the data block before the dependent record during recovery, and the data block may not be validly recovered.

For example, a database is being recovered from a backup. The database includes the data block modified by the changes recorded by redo record A and redo record B. The changes to the data block occurred after the backup was created. To recover the data block correctly, redo record A must be applied to the data block before redo record B. If the dependency that redo record B has on redo record A is not resolved, then redo record A was not persisted and is not available to be applied to provide a valid recovery of the data block.

A common scenario in a DBMS is that separate uncommitted transactions may modify the same data block, and as a consequence, an antecedent record and dependent record for the data block may be stored in separate SRBs. Without a mechanism to prevent otherwise, it is also possible that the SRB holding the dependent record is flushed to a PRB without flushing the SRB holding the antecedent record to a PRB. Thus, a dependent redo record may be persisted without the having persisted the antecedent record. A failure may prevent the antecedent record from being persisted at all. As a result, the antecedent record is not available for recovering the data block and the data block may not be validly recovered.

Described herein are mechanisms that prevent a dependent record from the being persisted without the respective antecedent record having been persisted in either a PRB or a ORL. Such mechanisms are referred to herein as dependence persistent enforcement ("DPE").

3.1 DPE Mechanisms

Several types of DPE mechanisms are described. These are referred to herein as Early Flush and Commit Flush. Both mechanisms detect when a dependent redo record will be created, and in response, undertake measures to ensure that the dependent redo record is not persisted before the antecedent record. Such measures may include a database session determining that a SRB of another database session will hold an antecedent record for redo record to be created by the database session, and in response to this determination, "commandeering" the SRB and flushing the redo therein to a PRB, thereby resolving the dependency. An important way in which Early Flush differs from Commit Flush is when a database session attempts to flush an SRB of another database sessions. Early Flush attempts to flush another database session's SRB before making a change to a data block and generating a redo record that will be dependent on a redo record in another database session's SRB. Commit Flush attempts similarly flushing of another database session's SRB at commit time.

Figure 3:
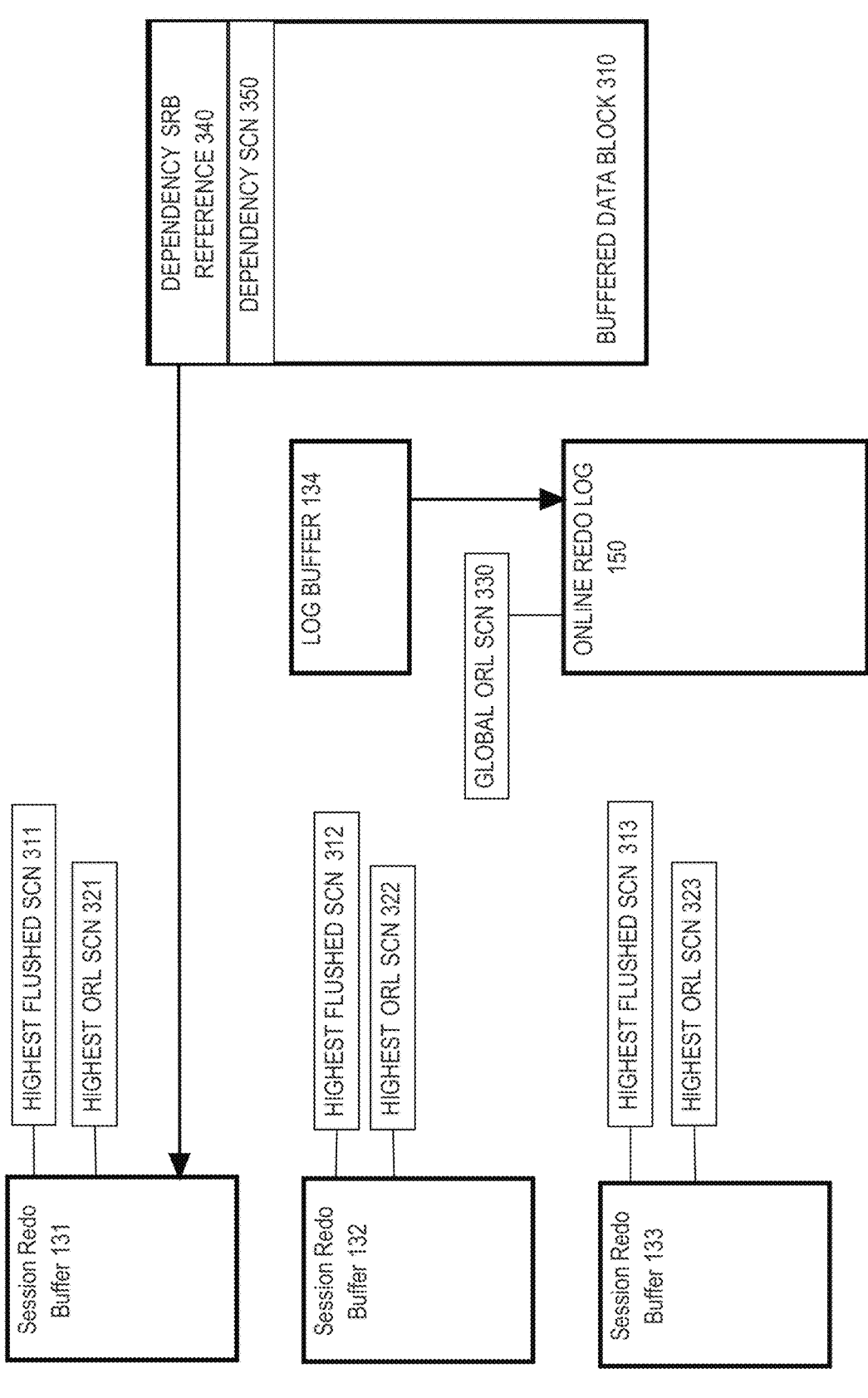
FIG. 3 is a block diagram that depicts example dependency tracking data and associated structures.

FIG. 3 depicts dependency tracking data and associated structures. The dependency tracking data and associated structures is used for Early Flush while some are used for Commit Flush. Commit Flush also uses other forms of dependency tracking data and data structures, which are later described.

Referring to FIG. 3, it depicts buffered data block 310. Buffered data block 310 includes dependency SRB reference 340 and dependency SCN 350. A dependency SRB reference is generated by a database session when the database session changes a buffered data block. The dependency SRB reference is a reference to the SRB used by the database session to store the redo record recording the change to the data block. As depicted in FIG. 3, the dependency SRB reference of data block 310 is referring to SRB 131. The database session also stores in the data block an SCN associated with the change, which is also associated with the redo record generated for the change. With respect to the dependency SRB reference and its respective dependency, the SCN is referred to as the dependency SCN.

The dependency SRB reference and dependency SCN is stored in a data block buffer header. A data block buffer header stores metadata about a buffered data block. A buffer header may be stored in an in-memory structure separate from the data blocks, such as in an array of buffer headers.

When another database session is processing another change to the buffered data block, a dependency SRB reference in the buffered data block informs the database session that the redo record that will be generated for the change will have a dependency on a redo record in the SRB referred to by the dependency SRB reference.

For example, in response to changing data block 310, a database session A stores redo record A in SRB 131. The database session creates the dependency SRB reference referring to SRB 131. The SCN associated with the change is 1000 and is stored in the data block. The respective dependency SCN of the dependency SRB reference is 1000.

Another database session B using SRB 132 initiates a change to data block 310. Before making the change and generating redo record B for the change, database session B checks for a dependency SRB reference in data block 310. Having detected the dependency SRB reference in data block 310, database session B determines that redo record B will be a dependent redo record having a dependency on some redo record in SRB 131 having the respective dependency SCN of 1000. That record happens to be record A. The database session however has not identified record A as the antecedent record giving rise to the dependency and neither is such identification necessary. Instead, having determined that this dependency will be created on a redo record in SRB 131, the database session attempts measures to ensure that redo records in SRB 131 are persisted before creating dependent redo record B in SRB 132, thereby resolving redo record B's dependency on record A.

Among these measures is to compare a "global ORL SCN" to the dependency SCN. Associated with ORL 150 is global ORL SCN 330 that is the highest SCN of any redo record persisted in ORL 150. Due to global ordering of ORL 150, a redo record having an SCN equal to or less than the ORL SCN has been persisted in ORL 150. Thus, if the ORL SCN is at least equal to the dependency SCN, then the respective redo record has been persisted in ORL 150.

In the current example, the ORL SCN is compared to the dependency SCN of 1000. If the ORL SCN is least equal to 1000, then the antecedent redo record giving rise to the dependency must have been flushed to PRB 141.

On the other hand, if the ORL SCN is less than the dependency SCN, then the ORL SCN does not indicate that the antecedent redo record giving rise to the dependency has been persisted. In this case, a highest flushed SCN of the referenced SRB is checked.

Highest flushed SCNs 311-313 are respectively associated with each of SRB 131-133. The highest flushed SCN specifies the highest SCN of any redo record flushed from the SRB to a PRB. A redo record that is or was stored in the SRB having an SCN that is less than or equal to the respective highest flushed SCN has been persisted to a PRB.

In the current example, the highest flushed SCN of SRB 131 is compared to the dependency SCN of 1000. If the highest flushed SCN is at least equal to 1000, then the antecedent redo record giving rise to the dependency must have been flushed to PRB 141.

On the other hand, if the highest flushed SCN is less than the dependency SCN, then the highest flushed SCN does not indicate that the antecedent redo record giving rise to the dependency has been persisted. In this case, commandeering the SRB referenced by the dependency SRB reference is attempted in order to flush the SRB. The term commandeering is used herein to refer to a database session obtaining control of a SRB being used by another database session to flush redo records generated by the other database session to the respective PRB of the SRB.

As shall be explained in greater detail, it is possible that the SRB sought to be commandeered by a database session may itself include a dependent redo record that may have an unresolved dependency. In this case, rather than attempting to resolve this unresolved dependency, by commandeering another SRB, which may lead to the need to commandeer even more SRBs, the database session defers resolving the dependency. In addition, the database session sets a "highest ORL dependency" associated with database sessions SRB to the value of the dependency SCN if greater than the current value of the highest ORL dependency.

Herein, a highest ORL dependency is also referred to as a highest ORL SCN. As shown in FIG. 3, each of SRBs 131-133 is associated with a highest ORL dependency, shown as respective highest ORL SCNs 321-323. For a particular SRB, the highest ORL dependency specifies the highest dependency SCN of any dependency of a redo record that is or has been stored in the SRB. As shall be explained later, during subsequent DRE processing, a highest ORL dependency may be increased to another even higher dependency SCN.

When the ORL SCN of ORL 150 is at least equal to the highest ORL dependency of a SRB, then any dependency that had existed for any redo that was or is in the SRB has been resolved. A reason the term "highest ORL dependency" includes the term "ORL" is that an SRB is not flushed under certain circumstances until the ORL SCN is at least equal to the highest ORL dependency.

In the current example, database session B does not commandeer SRB 131 and flush it. Database session B sets the highest ORL dependency of SRB 132 to the dependency SCN of 1000. Later, database session B encounters in another data block a dependency SRB reference with a dependency SCN of 1088. Again, not being able to commandeer and a flush the referenced SRB, database session B increases the highest ORL dependency of session buffer 132 to 1088.

4.0 Early Flush Procedure

FIG. 4 depicts a procedure for Early Flush performed by a database session while executing a transaction that modifies a data block in a data block buffer. The procedure is performed in response to the database session detecting a dependency SRB reference in the data block (see step 401), thereby detecting a dependency. The dependency SRB reference is detected before generating a redo record for the change to the data block and changing the data block.

At step 402, the database session determines whether the ORL SCN indicates that the dependency is resolved. The determination is made by comparing the respective dependency SCN to the ORL SCN. If the ORL SCN is least equal to the dependency SCN, then the dependency has been resolved. Otherwise, the ORL SCN does not indicate the dependency has been resolved and the database session next checks the highest flushed SCN of the SRB referenced ("referenced SRB") by the dependency SRB reference of the data block.

At step 403, the database session determines whether the highest flushed SCN of the referenced SRB is at least equal to the dependency SCN. The determination is made by comparing the dependency SCN to the highest flushed SCN. If the highest flushed SCN is least equal to the dependency SCN, then the dependency has been resolved.

Otherwise, at step 404, the database session determines whether the database session should commandeer the referenced SRB. The database session only commandeers the referenced SRB when the respective highest ORL dependency of the referenced session buffer indicates there are no unresolved dependencies for any redo record in the referenced SRB.

The highest ORL dependency of the referenced SRB may be used in two ways to determine whether there any resolved dependencies for the referenced SRB. First, the ORL SCN is compared to the highest ORL dependency of the referenced SRB to determine whether the ORL SCN is at least as equal to the highest ORL dependency. If so, then there are no unresolved dependencies for the referenced SRB. Second, the highest ORL dependency may not specify an SCN because the ORL SCN was never set or was reset when the referenced SRB was flushed to a persistent buffer.

At step 405, when the highest ORL dependency of the referenced SRB does not indicate that all dependencies of the referenced redo buffer are resolved, the database session foregoes flushing the referenced SRB. Instead, the database session sets the highest ORL dependency of the database session's current SRB to the dependency SCN, if the highest ORL dependency is less than dependency SCN. Next, the database session initiates operations performed for modifying the data block at step 407, as later described.

At step 406, if the highest ORL dependency of the referenced SRB does indicate that there are no unresolved dependencies for the referenced SRB, the database session commandeers the referenced SRB and flushes the redo records therein to the respective PRB. After flushing the redo records, the highest ORL dependency of the referenced session buffer may be reset.

At step 407, the database session generates a redo record for the change to the data block. The database session then stores the redo record in the database session's current SRB.

At step 408, the database adds or modifies a dependency SRB reference in the data block. The dependency SRB references refers to the database session's current SRB. The database session also adds the SCN for the change to the data block.

At 409, the database changes the data block in the data block buffer.

5.0 Commit Flush

Under Commit Flush, as a database session executing a transaction modifies data blocks and stores redo in the database session's current SRB, the database session tracks any unresolved dependencies that stem for other SRBs, The unresolved dependencies are tracked in a session dependency array. Each element in the array corresponds to an SRB. While executing the transaction, if at least one dependency SRB reference corresponding to an SRB is encountered in a data block, the element corresponding to the SRB in the session dependency array is set to the highest dependency SCN encountered during the transaction for the SRB. In addition, the highest dependency SCN stored in the session dependency array is tracked; this SCN is referred to highest SRB dependency SCN with the respect to the session dependency array and database session's current SRB.

At commit time, the database session's current SRB is not flushed until it has been determined that all the dependencies tracked by session dependency array have been resolved. Though some of the dependencies may have been unresolved when the session dependency array was set to record the dependencies, the dependencies may have been resolved by commit time.

Other of the dependencies may not have been resolved at commit time. An attempt is made to resolve these dependencies by commandeering an SRB to flush the SRB.

Figure 5:
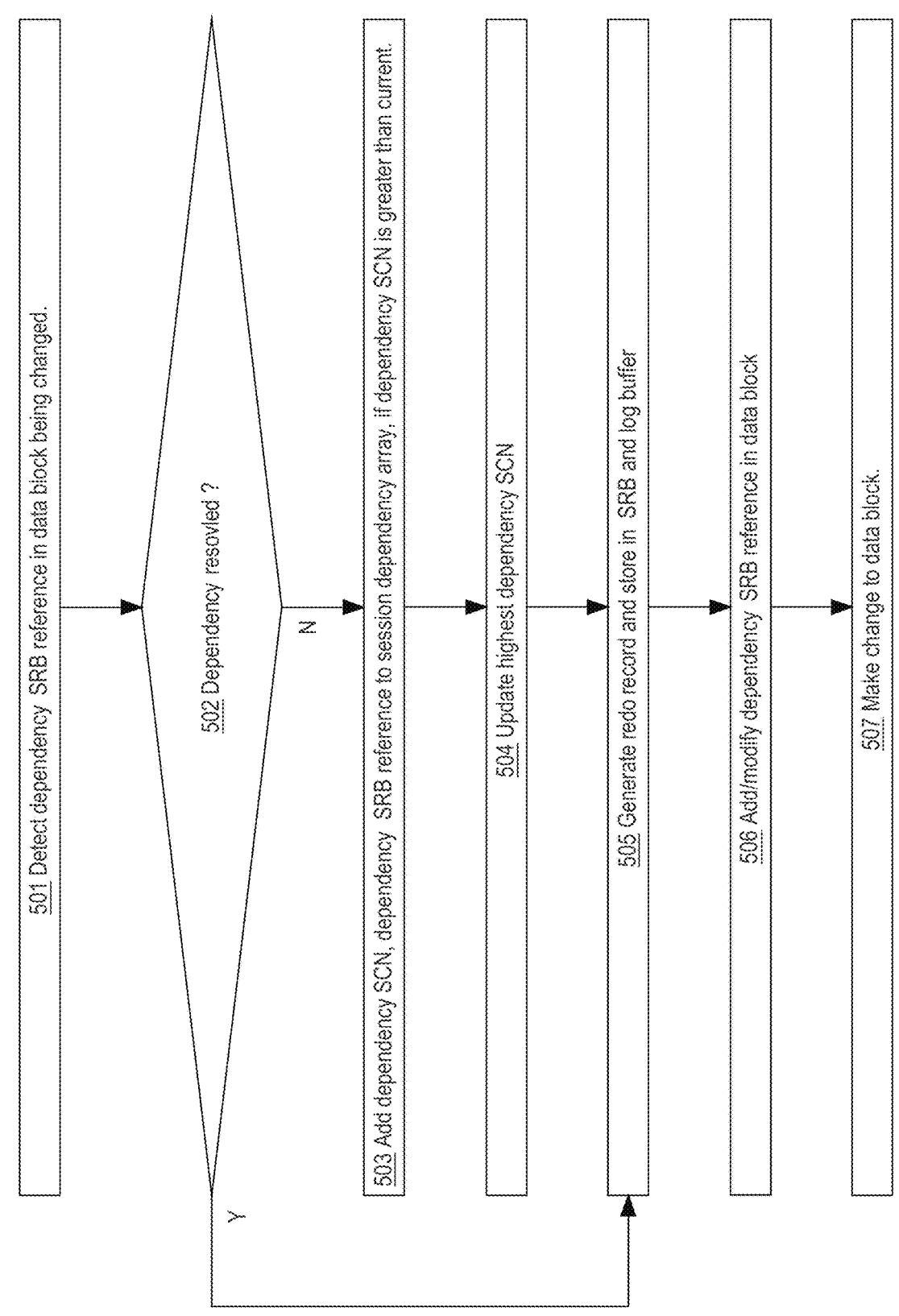
FIG. 5 is a flow diagram that depicts an example procedure performed by a database session to populate a session dependency array while modifying data blocks during a transaction.
Figure 6:
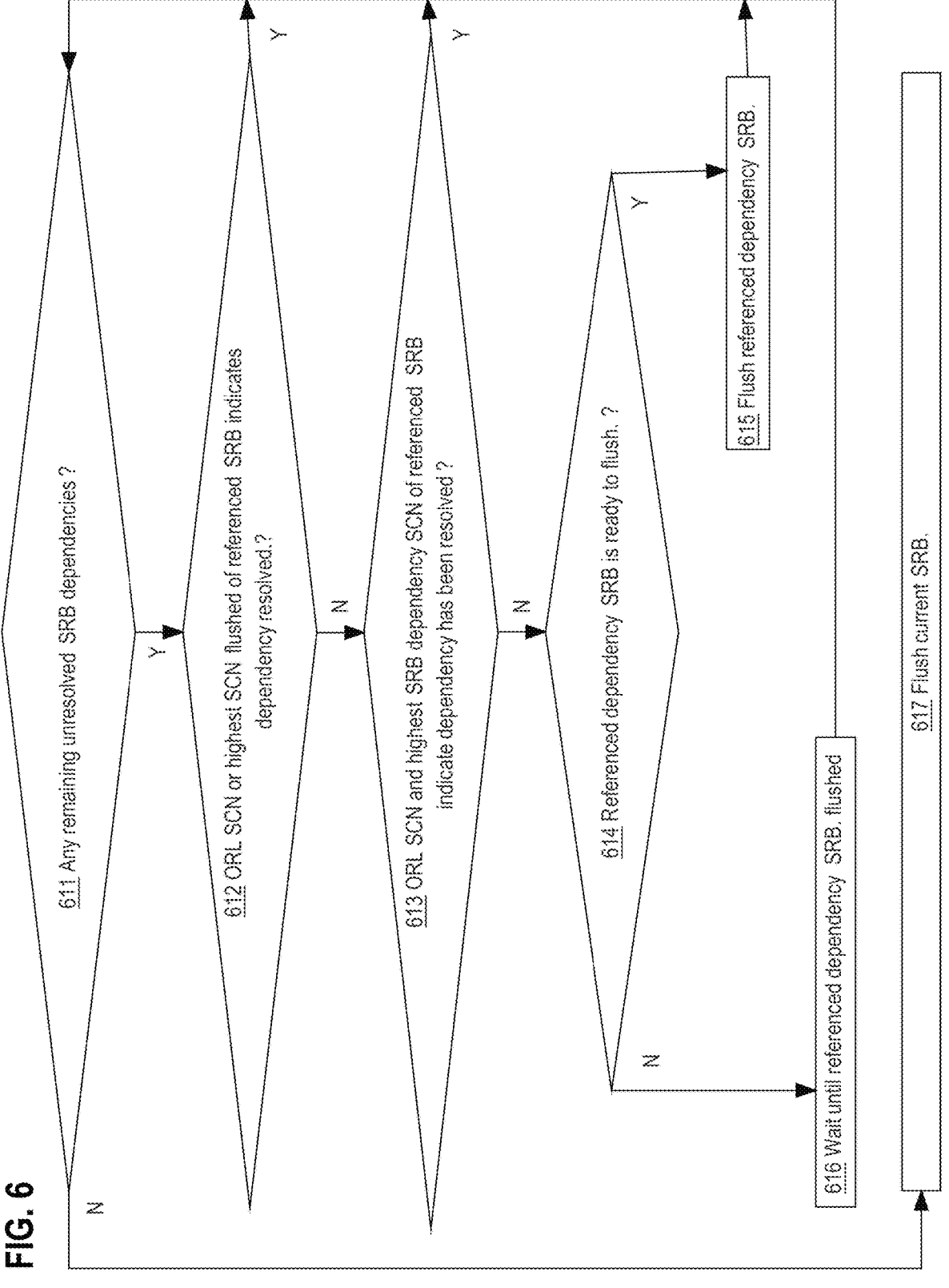
FIG. 6 is a flow diagram that depicts an example procedure performed at commit time for commit flushing by a database session executing a transaction.

FIGS. 5 and 6 depicts an implementation of Commit Flush. FIG. 5 depicts a procedure performed by a database session to populate the session dependency array while modifying data blocks during a transaction. FIG. 6 depicts a procedure performed to ensure dependencies represented by the session dependency array have been resolved before the database session flushes its current SRB.

6.1 Populating Session Dependency Array

Referring to FIG. 5, at step 501 a database session executing a transaction detects a dependency SRB reference in a data block being changed.

At step 502, the database session determines whether the dependency represented by the dependency SRB reference has been resolved. As described earlier with respect to Early Flush, the database session determines whether the ORL SCN indicates that the dependency is resolved based on the respective dependency SCN recorded in the data block. If the ORL SCN is less than the dependency SCN, the database session next checks the highest flushed SCN of the referenced SRB. If the highest flushed SCN is less than the dependency SCN, then the database session determines that the dependency is not resolved.

At step 503, in response to determining the dependency is not resolved, the database session updates the session dependency array element corresponding to the referenced SRB to the dependency SCN. If the dependency SCN is greater than the existing SCN value stored in the element, the value is overwritten with the dependency SCN. In an embodiment, the array index of an element in the session dependency array corresponds and uniquely identifies an SRB. In this way, an element's index serves as a reference to the SRB.

At step 504, the highest SRB dependency SCN is updated. The highest SRB dependency SCN is updated to the maximum of its current value and the dependency SCN.

At step 505, the database session generates a redo record for the change to the data block. The database session then stores the redo record in the database session's current SRB.

At step 506, the database adds or modifies a dependency SRB reference in the data block. The dependency SRB references refers to the database session's current SRB. The database session also adds the SCN for the change to the data block.

At 507, the database changes the data block in the data block buffer.

6.0 Commit Time

FIG. 6 depicts the procedure performed at commit time for Commit Flush by a database session executing a transaction. The procedure is performed before committing the transaction. A database session may commence to commit the transaction in response to receiving a request from a user through the database session to commit the transaction.

The process of FIG. 6 begins at step 611. At step 611, the database session determines whether there may be any remaining unresolved dependencies recorded in the session dependency array. This determination may be made by comparing the ORL SCN to the highest SRB dependency SCN. If the ORL SCN is less than the highest SRB dependency SCN, then there are unresolved dependencies. If all dependencies are resolved, in step 617 the database session flushes the SRB to the respective PRB.

Otherwise, there may be unresolved dependencies recorded by the session dependency array. In response, each element in the session dependency array that records a dependency is examined. As shown, a control flow loop contains steps 611-616. In each iteration of the loop, steps 612-616 process one respective distinct dependency on one respective distinct referenced SRB. For example, if the session dependency array of the database session indicates dependencies on two referenced SRBs, then the loop has two iterations.

At step 612, the database session determines whether the ORL SCN or the highest flushed SCN of the referenced SRB by the element indicates that the respective dependency has been resolved. If either the ORL SCN or the highest flushed SCN of the referenced SRB is at least equal to the dependency SCN of the element, the dependency has been resolved. If not, the database session next determines whether the referenced SRB can be immediately flushed.

At step 613, the database session compares the respective highest SRB dependency SCN of the referenced SRB to the ORL SCN. If the ORL SCN is at least equal to the highest SRB dependency SCN, then a next iteration of the loop begins with step 611.

Otherwise, the ORL SCN is less than the highest SRB dependency SCN, there may be unresolved dependencies for the referenced SRB as determined by step 614. If in step 614 the database session determines that the referenced SRB is ready to flush, then at step 615, the database session commandeers the referenced SRB and flushes the redo therein to the respective PRB.

If in step 614 the database session instead determines that the referenced SRB cannot be immediately flushed, then step 616 foregoes immediately flushing the referenced SRB. Step 616 instead waits for the dependency to by persisted either by: a) the database session of the referenced SRB flushes the referenced SRB, or b) any database session or thread of DBMS 100 flushes log buffer 134 to ORL 150.

In an embodiment, subsequent iterations of the loop occur while the current iteration waits in step 616. In any case, step 617 occurs only after no iterations are waiting in step 616. At step 617, the database session flushes its current SRB to the respective PRB.

7.0 Re-Silvering and Recovery Process

Figure 7:
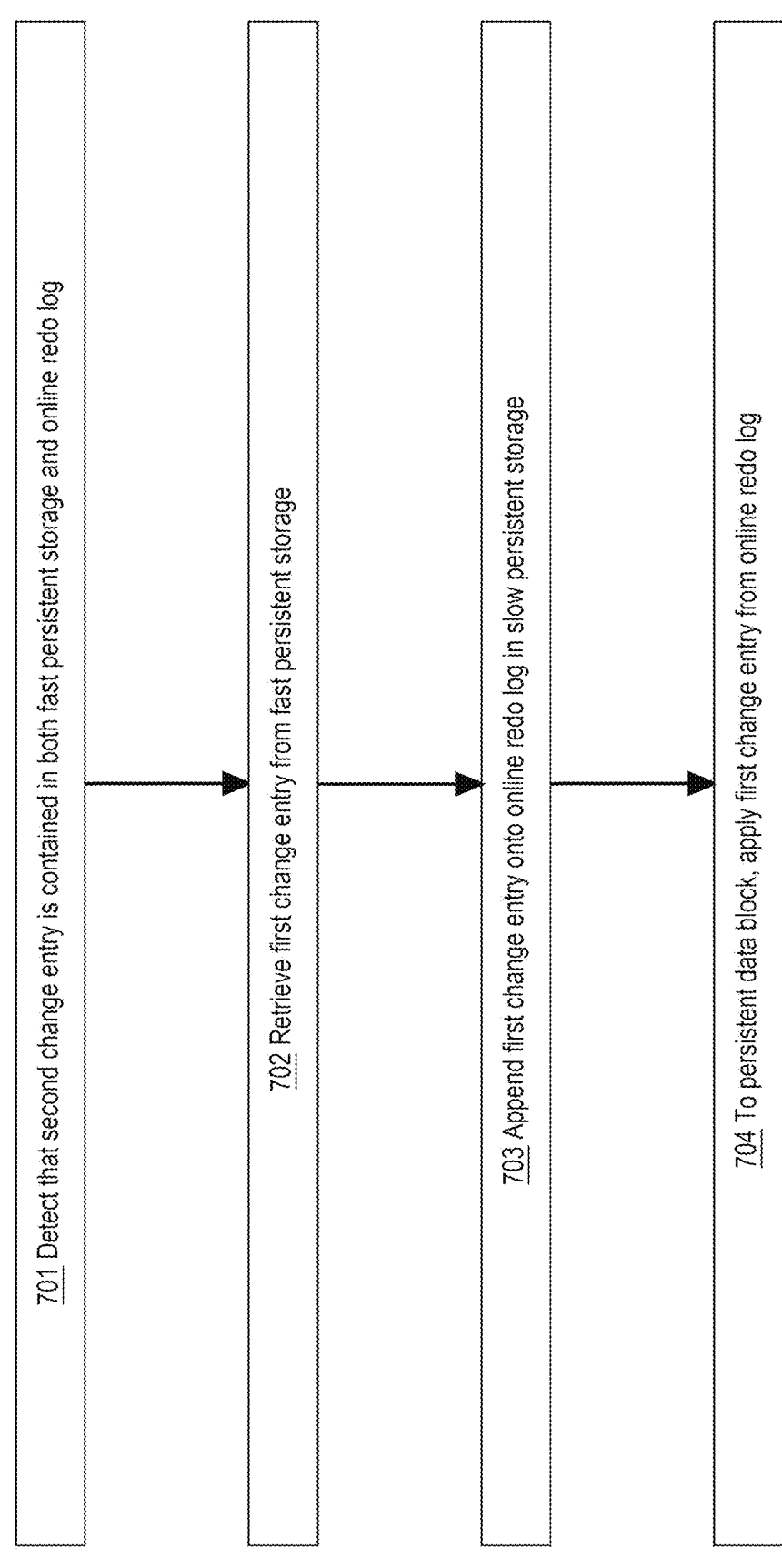
FIG. 7 is a flow diagram that depicts an example computer process that a DBMS may perform during recovery.

FIG. 7 is a flow diagram that depicts an example computer process that DBMS 100 may perform during recovery, in an embodiment. FIG. 7 is discussed with reference to FIG. 1.

The process of FIG. 7 recovers redo records that were persisted in PRBs 141-143 but not persisted in ORL 150. Herein during recovery, a buffered redo record is a redo record in any of PRBs 141-143. Only persisted redo records are processed during recovery. Volatile buffers 131-134 are unused during recovery.

Re-silvering is a recovery action that: a) detects when buffered redo records in PRBs 141-143 are not contained in ORL 150, b) detects what is a global ordering of those buffered redo records, and c) appends those buffered redo records onto ORL 150. Here, detections (a) and (b) are based on analyzing SCNs.

When recovery begins, PRB 141 may be empty or contain redo records of a same or different transactions by a same or different database sessions before the crash. Some or all redo records in PRB 141 might be expired. The recovery process of FIG. 7 detects and ignores those of PRBs 141-143 that are empty.

For buffered redo records in PRBs 141-143, a general pattern at the beginning of recovery may be that buffered redo records with lower SCNs are expired, but buffered redo records with higher SCNs are unexpired. Step 701 detects and ignores expired buffered redo records. As discussed earlier herein, during normal operation, DBMS 100 retains, in volatile memory 111 and slow persistent storage 113, the SCN of a redo record that was last appended onto ORL 150, which is the ORL SCN.

As explained earlier herein, ORL 150 contains globally ordered redo records, but PRBs 141-143 instead contain redo records that are locally ordered within each transaction but not globally ordered. Because a global ordering may interleave redo records of multiple concurrent transactions, such as shown in log buffer 134, PRB 141 should not be processed as a whole and without regard to PRBs 142-143, because re-silvering might need to interleave redo records of PRBs 141-143.

For global ordering during re-silvering, two redo records that should be contiguously appended onto ORL 150 may be retrieved together from PRB 143 or separately retrieved from respective PRBs 142-143 depending on the example, and the steps of the process of FIG. 7 are the same in either case.

Steps 701-702 reestablish a global ordering of redo records. In step 701, metadata in PRBs 141-143 is analyzed to detect what is the lowest SCN number of an unexpired redo record in PRBs 141-143 and what is the highest SCN number of an expired redo record in PRBs 141-143.

Any SCN that equals or exceeds the ORL SCN corresponds to an unexpired redo record as discussed above. Any SCN that is less than the ORL SCN corresponds to an expired redo record. Expired redo records are ignored and not processed. If a PRB contains only expired redo records, then the process of FIG. 7 treats that buffer as empty and ignores that buffer. If all PRBs are empty, then re-silvering is not needed, and steps 702-703 do not occur. In that case, step 704 may occur.

Step 702 maintains a respective pointer or offset into each of PRBs 141-143 that are not empty. Initially each pointer points to the oldest (i.e. lowest SCN) unexpired redo record in the buffer. In each iteration, which iterates a redo record, step 702 identifies which pointer points to an unexpired redo record with the lowest SCN.

Reestablishing a global ordering of redo records may entail iterating over unexpired redo records from lowest SCN to highest SCN. Each iteration inspects a respective distinct redo record, regardless of which of PRBs 141-143 contain the redo record of a current, previous, or next iteration.

When step 702 begins, there is at least one non-empty PRB, and all of the SCN range of all unexpired redo records were identified by step 701. Step 702 is repeated in each iteration.

Step 702 retrieves the currently iterated unexpired redo record from whichever of PRBs 141-143 contains that redo record and copies that redo record into a buffer in volatile memory 111. Step 702 may access multiple PRBs and have many iterations, but step 702 populates only one volatile buffer. Iteration by step 702 continues until no un-iterated unexpired redo records remain. According to this iterative global SCN ordering, all unexpired redo records from all PRBs 141-143 are copied into the volatile buffer.

Step 703 flushes the volatile buffer, which appends all unexpired redo records onto ORL 150. In an embodiment, step 703 also retains the SCN of that redo record as the ORL SCN.

During recovery, ORL 150 is operated as a first in first out (FIFO) queue. Step 703 appends more recent redo records to the tail of ORL 150, and step 704 removes less recent redo records from the head of ORL 150.

Step 704 applies redo records that it dequeues to persistent database blocks that were written by transactions. In an embodiment, step 704 does not occur until steps 702-703 finishes. In an embodiment with pipeline parallelism, steps 703-704 may concurrently occur. For example if ORL 150 was not empty when DBMS 100 crashed, then step 704 may begin applying redo records before step 703 begins.

Re-silvering finishes when step 703 finishes. In an embodiment, recovery finishes when re-silvering is finished, even if step 704 has not emptied ORL 150, or even if step 704 has not started. When recovery finishes, DBMS 100 becomes online and in service for OLTP.

As discussed earlier herein, log buffer 134 and ORL 150 have a same original global ordering during normal OLTP operation of DBMS 100. However, log buffer 134 is unused during re-silvering steps 702-703 that reestablish a new global ordering in ORL 150. The re-silvering global ordering need not be identical to the original global ordering that was in log buffer 134 when DBMS 100 crashed.

For example, interleaved redo records of concurrent independent transactions (i.e. transactions that are not interdependent as discussed earlier and later herein) may have a different ordering in the re-silvering global ordering than the original global ordering. For example as discussed earlier herein, an SCN does not uniquely identify a redo record, and two redo records for different respective database blocks and different respective independent transactions are non-conflicting and may be reordered if both redo records share an SCN.

In an embodiment, non-conflicting redo records for different respective database blocks and different respective independent transactions may be reordered even if there is no shared SCN. In any case, re-silvering never reorders redo records that had already been appended onto ORL 150 when DBMS 100 crashed.

8.0 Fault Tolerant Re-Silvering Process

In an embodiment, volatile memory 111 and fast persistent storage 112 are not in a same computer. In other words, fast persistent storage 112 may be remote and, when fast persistent storage 112 is PMEM, then fast persistent storage 112 may be accessed by remote direct memory access (RDMA). If volatile memory 111 and fast persistent storage 112 are separated only by a rack backplane or one network switch, such as for ethernet or fibre channel, then accessing fast persistent storage 112 is still faster than slow persistent storage 113, even if slow persistent storage 113 is a local disk or local flash. For example, local flash may entail IOWAIT that PMEM RDMA mostly or entirely avoids.

Because RDMA is not limited to a local device, RDMA may access multiple remote PMEMs in different network elements. For example, RDMA to two PMEMs may still be faster than accessing flash once. Thus, redundant remote PMEMs are encouraged for high availability (HA) by fault tolerance, which presumes that a PMEM device may eventually fail. In embodiments, one or both PMEMs are remote or local.

In an embodiment, each PMEM in a pair of PMEMs contains a replica of each of PRBs 141-143. Flushing SRB 131 to PRB 141 may entail concurrently and redundantly flushing to both PMEMs. Recovery of DBMS 100 may discover that both PMEMs disagree as to the state/contents of PRBs 141-143 because one PMEM failed in the pair of PMEMs.

For example, congestion or crashing of a switch or backplane may crash DBMS 100 while redundantly flushing SRB 131 to a PMEM pair such that the flush succeeds for only one PMEM of the pair. In another example, one of the pair of redundant flushes fails due to the network switch or a PMEM device itself, but DBMS 100 does not crash. In that case, DBMS 100 may discontinue use of the unavailable PMEM device and continue normal OLTP operation using only the surviving PMEM. In any case, DBMS 100 may eventually crash while using both or only one PMEM, and detecting which PMEM should be used as a system of record for re-silvering during recovery may entail some analysis as follows.

Figure 8:
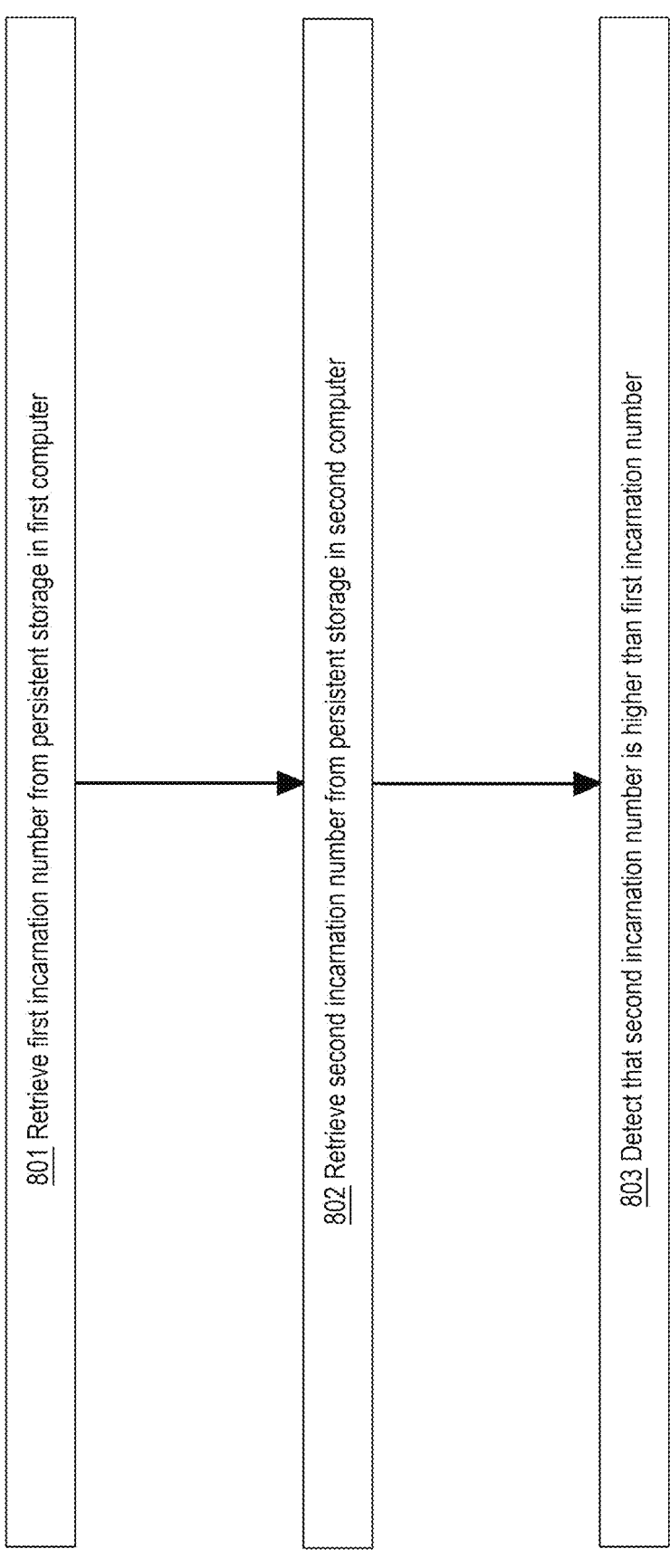
FIG. 8 is a flow diagram that depicts an example computer process that a DBMS may perform for fault tolerant re-silvering.

FIG. 8 is a flow diagram that depicts an example computer process that DBMS 100 may perform for fault tolerant re-silvering, in an embodiment. The steps of some or all of the processes of FIGS. 7-8 may be complementary and interleaved. FIG. 8 is discussed with reference to FIG. 1.

When DBMS 100 discovers that a previously unavailable PMEM device has become available, an SCN in that PMEM should not by itself be trusted because the PMEM might have been out of service since before DBMS 100 crashed and, in some cases, before DBMS 100 was recovered from backup. The process of FIG. 8 correctly selects a PMEM as a system of record for re-silvering.

In this example, mirrored fast persistent storages 112 are remote PMEMs. In other embodiments, the process of FIG. 8 works for mirrored fast persistent storages 112 that are local and/or are not PMEM, such as flash. For example, PRBs 141-143 may be mirrored in two local solid state drives (SSDs), and slow persistent storage 113 may be a disk. Various media combinations for persistent storages 112-113 are discussed earlier herein.

The process of FIG. 8 entails two or three computers, and at least one of those computers hosts DBMS 100, and that hosting computer performs the process of FIG. 8 during recovery of DBMS 100. Step 801 retrieves a first mirror incarnation number from a first fast persistent storage 112 in a first computer, such as by RDMA as discussed earlier herein. Step 802 retrieves a second mirror incarnation number from a second fast persistent storage 112 in a second computer.

Step 803 detects that the second mirror incarnation number is higher than the first mirror incarnation number, which causes step 803 to select the second fast persistent storage 112 as the system of record for re-silvering. In that case, re-silvering uses only the second fast persistent storage 112. As discussed earlier herein for FIG. 5, re-silvering step 502 entails retrieving unexpired redo records from the second fast persistent storage 112, such as by RDMA.

At the end of recovery, DBMS 100 may reinitialize the first fast persistent storage 112 that was not the system of record so that both of fast persistent storages 112 store a same mirror incarnation number and each mirror of each of PRBs 141-143 is empty. In that case, DBMS 100 may become online and in service for OLTP with both fast persistent storages 112.

When DBMS 100 transitions one of fast persistent storages 112 into or out of service, the mirror incarnation number is incremented by one and persisted in any fast persistent storage(s) 112 that is/are in service. DBMS 100 never changes the mirror incarnation number of a fast persistent storage 112 that is out of service.

In an embodiment, the mirror incarnation number is also incremented when log buffer 134 is flushed. In an embodiment, DBMS 100 may have more than two fast persistent storages 112. In that case, DBMS 100 may continue normal OLTP operation even if multiple fast persistent storages 112 fail.

9.0 Nonuniform Buffering Process

As discussed later herein, DBMS 100 may characterize and differentiate categories of transactions to prioritize OLTP transactions over bulky maintenance transactions. Prioritization may entail nonuniform buffering such that OLTP transactions should have priority access to SRBs. For example as discussed earlier herein, there may be more concurrent transactions than SRBs. Intelligent heuristics for rationing SRBs to characterized transactions may maximize throughput of DBMS 100 as discussed later herein.

Whether buffers 131-133 and 141-143 provide acceleration or deceleration depends on the mix of OLTP and non-OLTP transactions. For non-OLTP transactions, DBMS 100 should not use buffers 131-133 and 141-143 and should instead resort to conventional write ahead logging (WAL) based solely on log buffer 134.

The mix of transactions may fluctuate such that DBMS 100 should sometimes use buffers 131-133 and 141-143 and other times not use them. In an embodiment based on monitoring the transaction mix, DBMS 100 occasionally switches between using and not using buffers 131-133 and 141-143 for all transactions.

In an embodiment, DBMS 100 instead dynamically tunes a fluctuating ratio of: a) transactions that use buffers 131-133 and 141-143 to b) transactions that do not use buffers 131-133 and 141-143. In an embodiment, DBMS 100 opportunistically switches an uncommitted transaction that was using buffers 131 and 141 to instead use only log buffer 134 for the remainder of the transaction.

Figure 9:
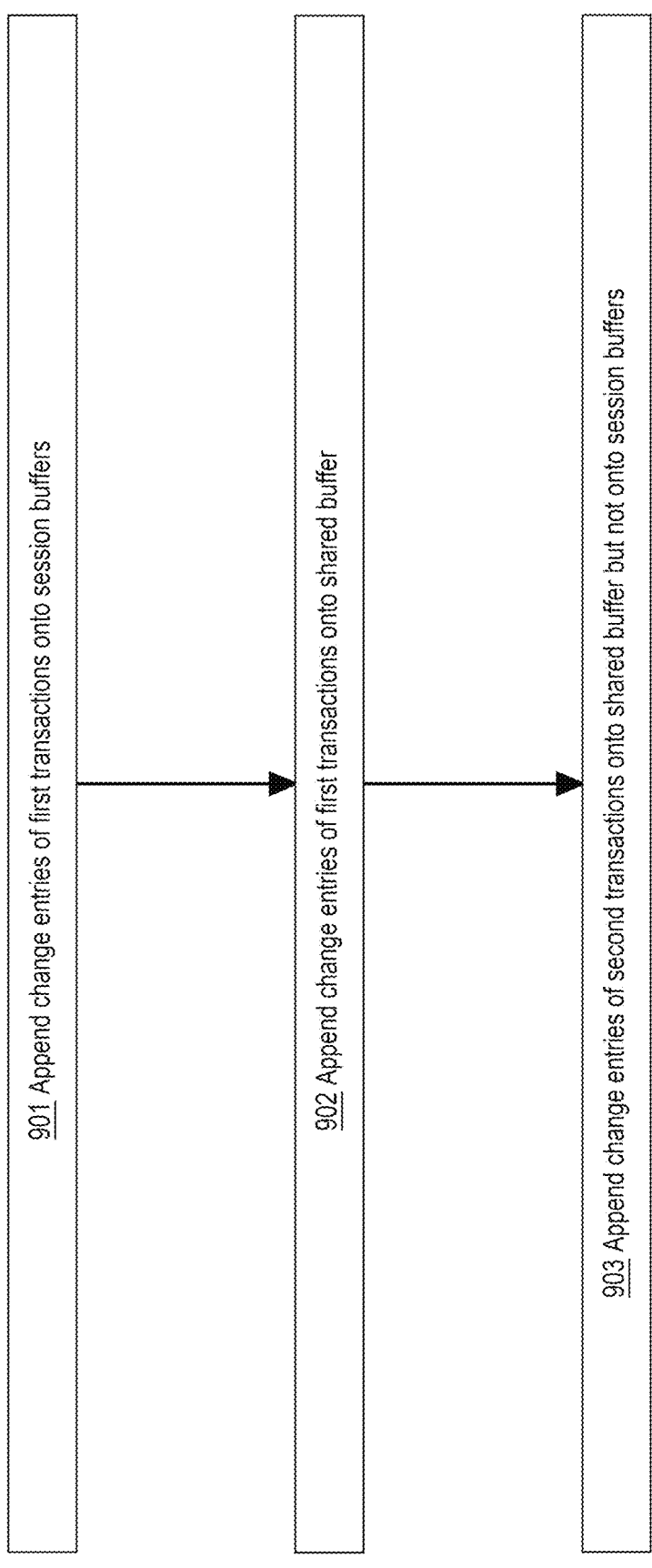
FIG. 9 is a flow diagram that depicts an example computer process that a DBMS may perform for nonuniform buffering.

Those various adaptive and dynamic behaviors are demonstrated in FIGS. 9-10. FIG. 9 is a flow diagram that depicts an example computer process that DBMS 100 may perform for nonuniform buffering, in an embodiment. FIG. 9 is discussed with reference to FIG. 1.

Steps 901-902 concurrently occur. Depending on embodiments discussed later herein, step 903 may or may not occur concurrently with steps 901-902.

Step 901 appends redo records of a first set of transactions onto SRBs 131-133. Ideally, the first set of transactions are OLTP transactions. Step 902 redundantly appends the same redo records onto log buffer 134. As explained earlier herein, log buffer 134 is also referred to as a shared buffer.

Step 903 appends redo records of a second set of transactions onto log buffer 134 but not onto SRBs 131-133. Ideally, the second set of transactions are non-OLTP. The process of FIG. 9 does not buffer the first and second sets of transactions in the same way. Nonuniform buffering of redo of transactions is novel.

10.0 Transaction Differentiation Process

FIG. 10 is a flow diagram that depicts an example computer process that DBMS 100 may perform to opportunistically switch an uncommitted transaction that was using buffers 131 and 141 to instead use only log buffer 134 for the remainder of the transaction, in an embodiment. The steps of the processes of FIGS. 9-10 may be complementary and interleaved. FIG. 10 is discussed with reference to FIGS. 1 and 9.

As explained earlier herein for FIG. 9, a first set of transactions uses buffers 131-134 and 141-143, and a second set of transactions instead uses only log buffer 134. In this example, the first and second sets of transactions concurrently execute.

In step 1001, database session 121 generates/starts a first transaction in the first set of transactions that uses buffers 131-134 and 141-143. In particular, database session 121 and the first transaction use buffers 131, 134, and 141.

In this example, a non-OLTP transaction is a long or large transaction. To detect a non-OLTP transaction, step 1002 has a size threshold of a count of redo records already generated by an uncommitted transaction and/or a longevity threshold of a duration that the transaction is uncommitted. In an embodiment, the size threshold is instead a count of bytes in those redo records.

Before the first transaction is ready to commit, step 1002 detects that the first transaction exceeds either threshold. Step 1002 detects that the first transaction is non-OLTP. In that case, retaining the first transaction in the first set of transactions that uses buffers 131-134 and 141-143 could decelerate DBMS 100 by priority inversion as redo of too many OLTP transactions is appended only onto slow and contentious log buffer 134 and ORL 150.

For subsequent redo records of the first transaction that are generated after step 1002 detected that the first transaction is non-OLTP, step 1003 reassigns the first transaction from the first set of transactions to the second set of transactions. Thus, subsequent redo records of the first transaction, eventually including the commit redo record of the first transaction, will be appended onto log buffer 134 but not onto SRB 131.

In step 1004, database session 121 generates a second transaction. The first and second transactions are separately characterized as OLTP or not. For example even though the first transaction was eventually characterized as non-OLTP, and even though the first and second transactions were generated by same database session 121, step 1005 may initially presume that the second transaction is not (e.g. yet)

non-OLTP. Step 1005 adds the second transaction to first set of transactions that uses buffers 131-134 and 141-143.

11.0 Mixed Flushing Process

Figure 11:
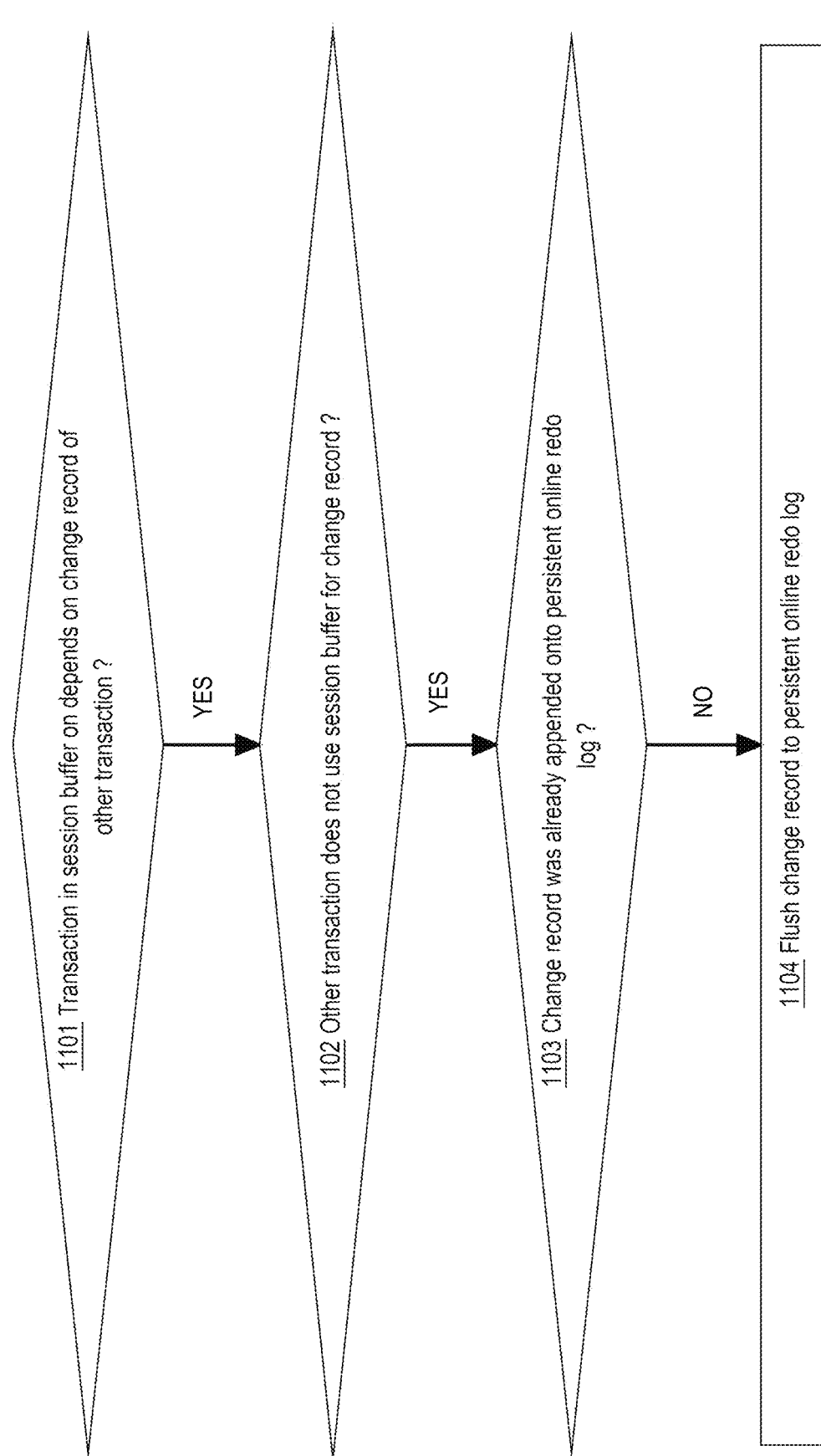

FIG. 11 is a flow diagram that depicts an example computer process that database session 123 may perform to persist transaction T2 that transaction T1 depends on, in an embodiment. FIG. 11 is discussed with reference to FIG. 1.

As explained earlier herein for FIG. 9, a first set of transactions uses buffers 131-134 and 141-143, and a second set of transactions instead uses only log buffer 134. Step 1101 detects that a first transaction that is ready to commit depends on a second transaction. Step 1101 occurs when transaction T1 of database session 123 becomes ready to commit. In this example, step 1101 detects that transaction T1 depends on a transaction of database session 121.

Step 1102 detects whether or not the redo record was never appended onto any SRB. Step 1102 effectively detects whether the second transaction is in the first set of transactions that uses buffers 131-134 and 141-143 or in the second set of transactions that instead uses only log buffer 134. Step 1102 deciding YES means that the second transaction is in the second set of transactions that uses only log buffer 134.

As explained earlier herein, each SRB has a session dependency array that contains identifiers of other SRBs to track dependencies on other SRBs. Herein, log buffer 134 also has an identifier. The session dependency array uses the identifier of log buffer 134 to indicate that the basis of a dependency is not in another SRB but was instead appended only onto log buffer 134. Only if step 1102 detects the identifier of log buffer 134 for the second transaction's redo record that is the basis of the dependency, then step 1102 decides YES.

Step 1103 is reached only if steps 1101-1102 cooperatively detected that the first transaction that is ready to commit depends on the second transaction that uses only log buffer 134. In that case, there are redo record(s) of the second transaction that were generated before some redo record(s) of the first transaction. Those redo record(s) of the second transaction should be persisted before those redo record(s) of the first transaction to preserve a global ordering.

Unlike the process of FIG. 4 that can synchronously flush a SRB to satisfy a dependency, the second transaction does not use a SRB. The redo record of the second transaction that is the basis of the dependency might have been appended only onto log buffer 134.

Step 1103 detects whether or not the redo record of the second transaction that is the basis of the dependency was already flushed from log buffer 134. If not, then the first transaction should not be persisted until step 1104 flushes that redo record of the second transaction from log buffer 134 onto ORL 150. In an embodiment of step 1104, database session 123 synchronously flushed log buffer 134.

In an embodiment of step 1104, database session 123 instead requests that log buffer 134 be asynchronously flushed. In that case, database session 123 should not acknowledge that the first transaction is committed until database session 123 is eventually notified by a callback from DBMS 100 that log buffer 134 was eventually asynchronously flushed.

Each iteration in the process may flush a distinct SRB to satisfy a respective dependency because the first transaction that is ready to commit may depend on multiple concurrent transactions.

The process of FIG. 11 may iterate in that way so long as those multiple concurrent transactions are in the first set of transactions that uses buffers 131-134 and 141-143. Those dependencies can be satisfied as discussed earlier herein. When an iteration encounters a dependency on a transaction that is in the second set of transactions that instead uses only log buffer 134, then that dependency is instead satisfied by steps 1101-1104.

When step 1104 occurs in an iteration, then iteration and the process of FIG. 11 ceases because step 1104 satisfies all dependencies because log buffer 134 is shared by all transactions and log buffer 134 is globally ordered.

12.0 Adaptive Buffering Process

As discussed earlier herein, DBMS 100 may monitor a fluctuating mix of transactions and may dynamically tune a ratio of: a) the size of the first set of transactions that use buffers 131-133 and 141-143 to b) the sum of the size of the first set and the size of the second set of transactions that do not use buffers 131-133 and 141-143. That is the SRBing ratio, which is the fraction or percentage of concurrent transactions that should use buffers 131-133 and 141-143. A SRBing ratio may be expressed as a percentage from zero to a hundred or as a fraction such as zero, half, or one.

Figure 12:
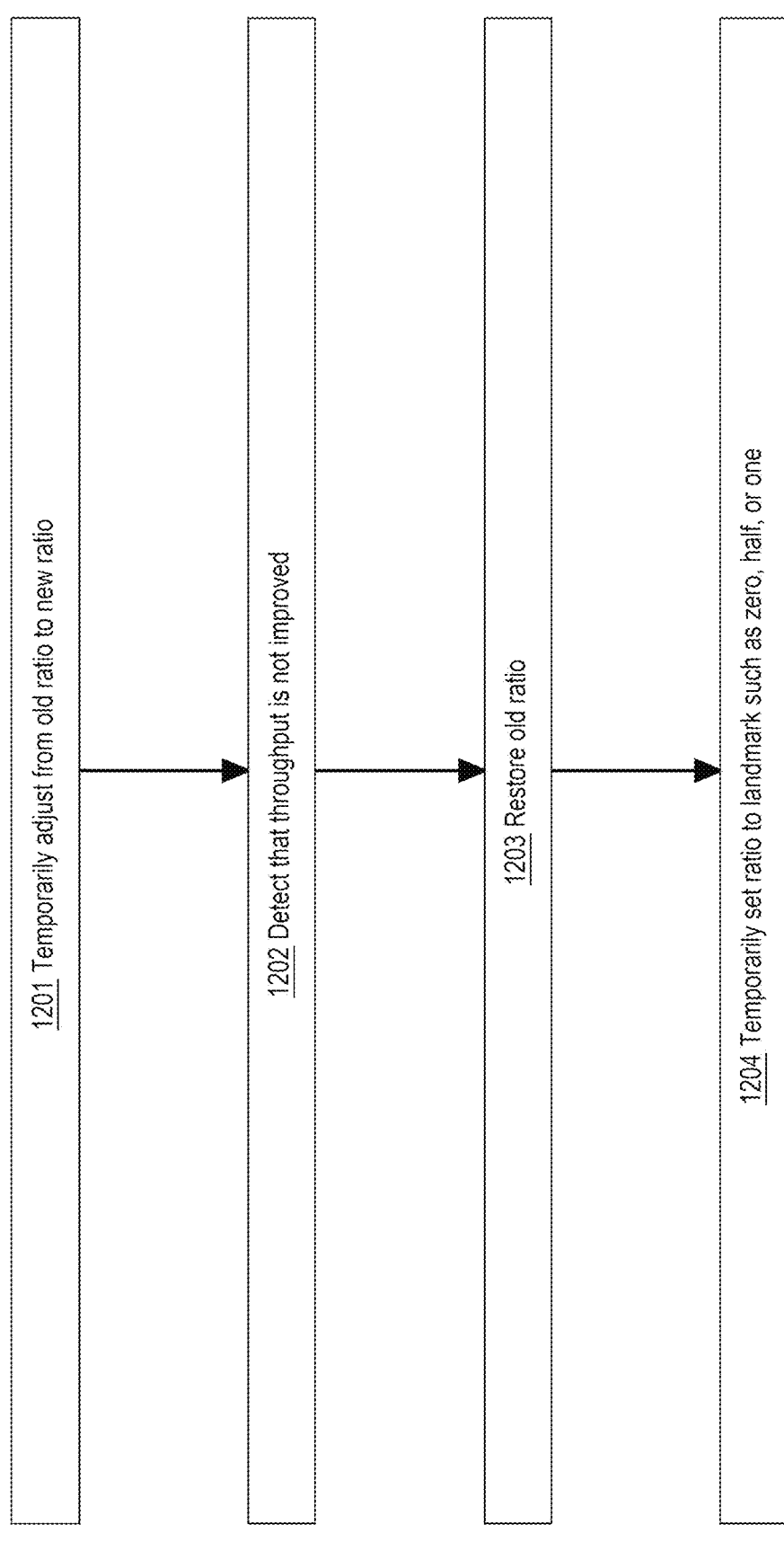
FIG. 12 is a flow diagram that depicts an example computer process that a DBMS may perform to dynamically tune the buffering of a fluctuating transaction mix.

FIG. 12 is a flow diagram that depicts an example computer process that DBMS 100 may perform to dynamically tune the buffering of a fluctuating transaction mix, in an embodiment. FIG. 12 is discussed with reference to FIG. 1.

DBMS 100 may impose a SRBing ratio that is optimal for a current mix of OLTP and non-OLTP transactions. For example if the SRBing ratio is half, then a new transaction should be added to whichever of the first or second set of transactions is smaller, which may fluctuate based on arrival of new transactions, completion of older transactions, and conversion by switching a transaction from the first set of transactions to the second set as discussed earlier herein. However if the mix of transactions changes, then the SRBing ratio is no longer optimal and throughput decreases.

DBMS 100 may more or less continuously monitor throughput as a rate at which data is flushed from log buffer 134 to ORL 150. An amount of flushed data may be measured as a count of bytes or redo records. If log buffer 134 flushes too frequently or too infrequently, throughput is decreased.

DBMS 100 may track: a) whether throughput is increasing or decreasing and b) a trend direction, which is whether a trend for the SRBing ratio has been increasing or decreasing over recently repeated occurrences of the process of FIG. 12. Based on that tracking, the SRBing ratio may be intelligently tuned to maximize throughput.

A first period, a second period, and a third period are three distinct and overlapping temporal periods that are used by the process of FIG. 12. Repetitions of the process of FIG. 12 are separated by the first period (e.g. one minute).

Step 1201 is speculative. Step 1201 temporarily adjusts the SRBing ratio from a current value to an evaluation value. For example, step 1201 may, based on whether the trend direction is increasing or decreasing, respectively add or subtract an increment (e.g. ten percent) to the current value to calculate the evaluation value. Step 1201 operates DBMS 100 with the evaluation ratio for the second period (e.g. six seconds) that is shorter than the first period.

Step 1202 detects whether or not throughput increased during the second period. If step 1202 detects an increase, then DBMS 100 adopts the evaluation ratio for at least the remainder of the first period. In an embodiment, step 1202 only adopts the evaluation ratio if the throughput increase exceeds an improvement threshold such as one percent. In an embodiment, step 1202 only adopts the evaluation ratio if a consecutive threshold count (e.g. five) of consecutive previous occurrences of step 1202 unanimously detected an improvement.

Otherwise, step 1202 detects that throughput decreased or was unchanged. In that case, step 1203 restores the value that was current before the evaluation value, and the evaluation value is discarded.

The third period is a multiple of the first period. For example, if the third period as twenty times as long as the first period, then only every twentieth repetition of the process of FIG. 12 will perform step 1204. Step 1204 is more speculative than step 1201 because step 1204 may speculatively select a landmark ratio that arithmetically differs by a greater amount from the current SRBing ratio.

In an embodiment, step 1204 selects one or more landmark ratios from ratio values of zero, half, and one. Step 1204 separately operates DBMS 100 with each selected landmark ratio for a landmark period (e.g. half a minute) that is longer than the second period and shorter than the first period and, based on whether or not throughput increases, either adopts the landmark ratio that provides the best improvement or restores the value that was current before the landmark ratio.

If no landmark ratio is adopted, then the direction trend remains unchanged. If zero or one is adopted, then the direction trend is respectively set to decreasing or increasing. If half is adopted, then the direction trend is set based on which of zero or one provides a larger increase or a smaller decrease.

Memory Overview

Because embodiments of the invention involve a novel use of a nonvolatile random access memory (NVRAM), referred to herein as persistent memory (PMEM). As used herein, "non-volatile" refers to a characteristic of a memory where data is retained in the absence of any form of electrical power, including external or battery backup. Examples of non-volatile memory include c-prom memory, flash memory, and disk memory. Non-volatile memory does not include volatile memory for which power is retained by a battery backup in the absence of another external power source. For example, volatile memory coupled to a board with an embedded battery-backup is not non-volatile memory, because, without the power provided by a battery, the volatile memory does not retain data.

Byte-addressable memory, such as PMEM and volatile dynamic random access memory (DRAM), is distinguishable from block-addressable memory. A byte or word is the minimum amount of data that may be addressed, retrieved from memory, or written to in byte-addressable memory. To manipulate one or more bits in a byte or word, a byte or word containing the bit must be fetched to a register of a processor executing a machine instruction that references the byte or word and manipulated according to the machine instruction or another machine instruction.

In contrast, the minimum size for a unit of block-addressable memory is a data block. A data block comprises multiple bytes and multiple words and cannot be entirely stored within a register of a processor. For block-addressable memory, a data block is the minimum amount of data that may be addressed, retrieved from memory, or written to memory. Examples of block-addressable memory include flash memory and disk memory. To manipulate a bit or a byte in a block, a block containing those bits is loaded into a byte-addressable memory by an instruction referencing the block issued to a block-based interface. Thus, block-addressable memory is not random access memory (RAM).

RAM is distinguishable from read-only memory (ROM) in that data in RAM can be overwritten. As used herein, overwriting data refers to replacing the data with new data without first having to erase the data in the memory. Thus, as used herein, RAM refers to byte-addressable memory that can be overwritten.

Using PMEM

In order for a process to access a region of PMEM, the region of PMEM is attached to the process. Attaching refers to mapping a virtual address space of a process to an address space of the PMEM. The mapping may be stored in for example, an MMU (memory management unit). An address space of PMEM may be interleaved across multiple memory modules (e.g. dual inline memory module).

According to embodiment of the present invention, a process is attached to a region of PMEM using a protocol similar that used for memory mapped files. An example of such a protocol is DAX (Direct Access). A mmap ( ) function may be called with an argument specifying the address space of the region of PMEM. Using PMEM is described in *Introduction to Programming with Persistent Memory from Intel*, by U. Usharani and Andy Rudoff, published on Aug. 14, 2017, the contents of which are incorporated by reference, and in *Persistent Memory Programming*, by Andy Rudoff, published Summer in 2017, the contents of which are incorporated herein by reference.

11.0 Database System Overview

A database management system (DBMS) manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
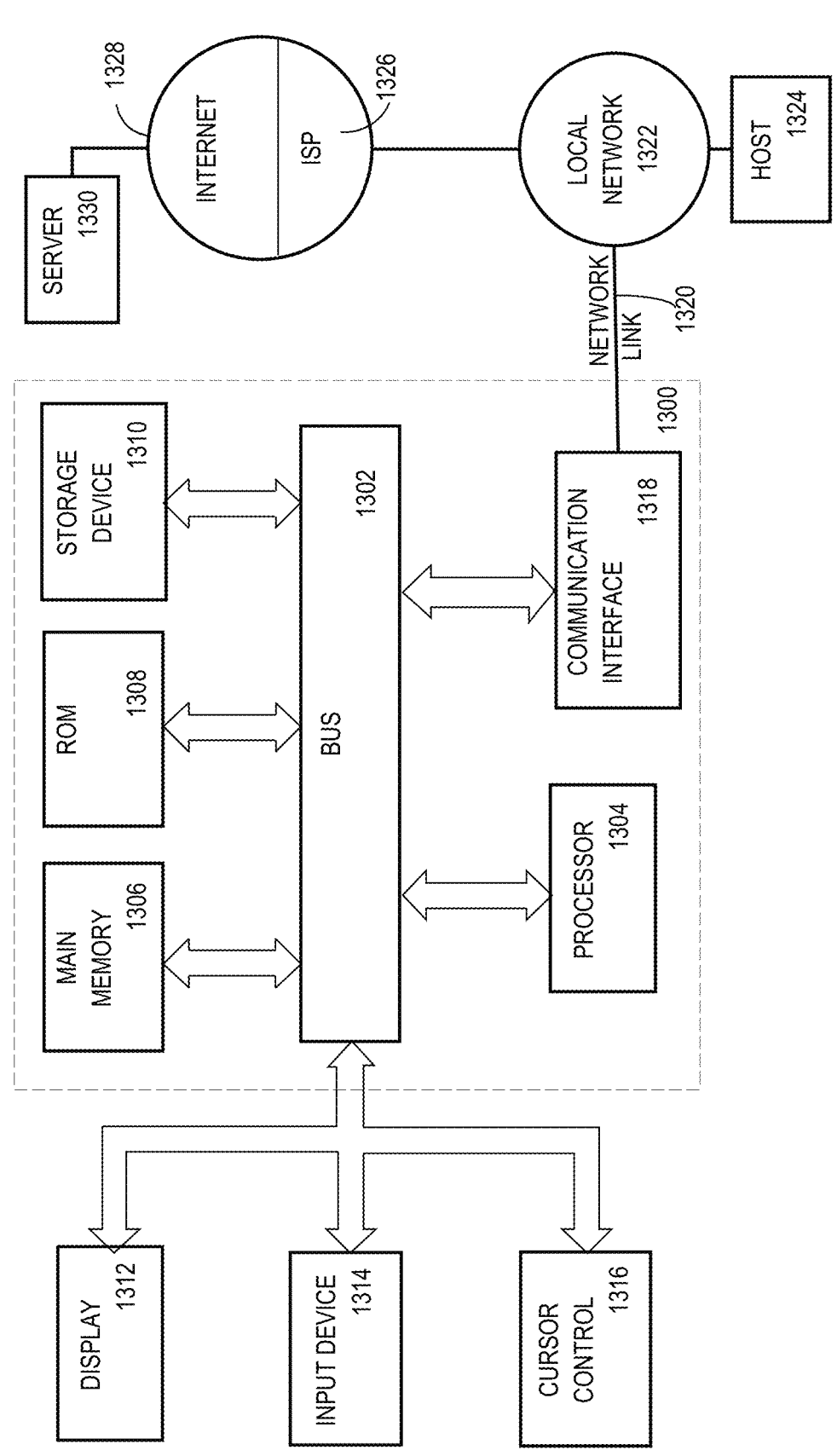
FIG. 13 is a block diagram that illustrates a computer system upon which an embodiment of the invention may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

Software Overview

Figure 14:
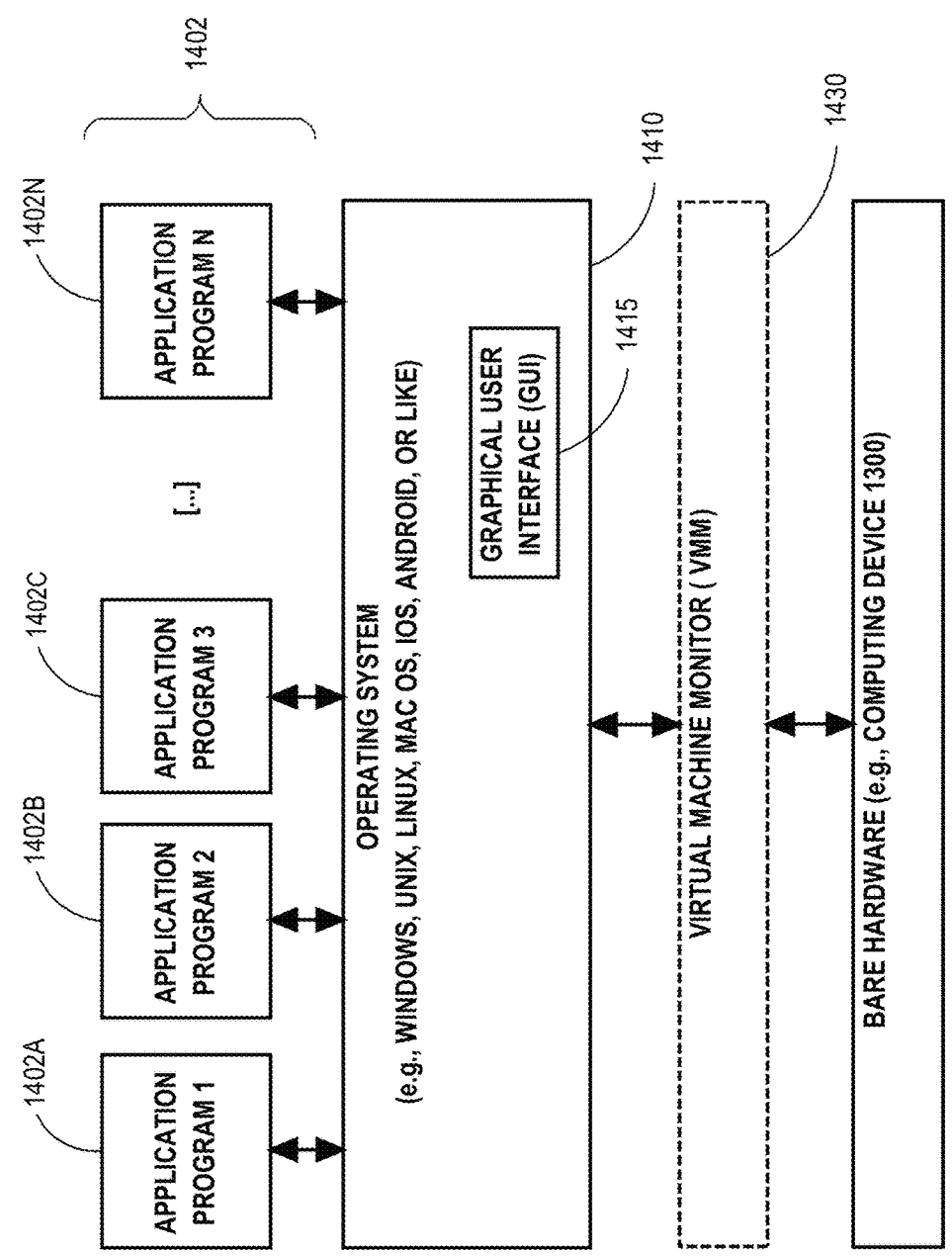
FIG. 14 is a block diagram that illustrates a basic software system that may be employed for controlling the operation of a computing system.

FIG. 14 is a block diagram of a basic software system 1400 that may be employed for controlling the operation of computing system 1300. Software system 1400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1400 is provided for directing the operation of computing system 1300. Software system 1400, which may be stored in system memory (RAM) 1306 and on fixed storage (e.g., hard disk or flash memory) 1310, includes a kernel or operating system (OS) 1410.

The OS 1410 manages low-level aspects of computer operation, including managing execution of processes, memory allocation, file input and output (I/O), and device I/O. One or more application programs, represented as 1402A, 1402B, 1402C . . . 1402N, may be "loaded" (e.g., transferred from fixed storage 1310 into memory 1306) for execution by the system 1400. The applications or other software intended for use on computer system 1300 may also be stored as a set of downloadable computer-executable instructions, for example, for downloading and installation from an Internet location (e.g., a Web server, an app store, or other online service).

Software system 1400 includes a graphical user interface (GUI) 1415, for receiving user commands and data in a graphical (e.g., "point-and-click" or "touch gesture") fashion. These inputs, in turn, may be acted upon by the system 1400 in accordance with instructions from operating system 1410 and/or application(s) 1402. The GUI 1415 also serves to display the results of operation from the OS 1410 and application(s) 1402, whereupon the user may supply additional inputs or terminate the session (e.g., log off).

OS 1410 can execute directly on the bare hardware 1420 (e.g., processor(s) 1304) of computer system 1300. Alternatively, a hypervisor or virtual machine monitor (VMM) 1430 may be interposed between the bare hardware 1420 and the OS 1410. In this configuration, VMM 1430 acts as a software "cushion" or virtualization layer between the OS 1410 and the bare hardware 1420 of the computer system 1300.

VMM 1430 instantiates and runs one or more virtual machine instances ("guest machines"). Each guest machine comprises a "guest" operating system, such as OS 1410, and one or more applications, such as application(s) 1402, designed to execute on the guest operating system. The VMM 1430 presents the guest operating systems with a virtual operating platform and manages the execution of the guest operating systems.

In some instances, the VMM 1430 may allow a guest operating system to run as if it is running on the bare hardware 1420 of computer system 1400 directly. In these instances, the same version of the guest operating system configured to execute on the bare hardware 1420 directly may also execute on VMM 1430 without modification or reconfiguration. In other words, VMM 1430 may provide full hardware and CPU virtualization to a guest operating system in some instances.

In other instances, a guest operating system may be specially designed or configured to execute on VMM 1430 for efficiency. In these instances, the guest operating system is "aware" that it executes on a virtual machine monitor. In other words, VMM 1430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
detecting that a change entry is contained in a first persistent storage and an online redo log in a second persistent storage that is slower than the first persistent storage;
deciding, based on said detecting, not to retrieve the change entry from the first persistent storage;
retrieving a second change entry from the first persistent storage;
appending, after said retrieving the second change entry, the second change entry onto the online redo log;
applying, to a persistent database block, the second change entry from the online redo log;
wherein the method is performed during database recovery.

2. The method of claim 1 further comprising:
retrieving a first incarnation number from the first persistent storage in a first computer;
retrieving a second incarnation number from the first persistent storage in a second computer;
detecting that the second incarnation number is higher than the first incarnation number;
wherein said retrieving the change entry is based on said detecting that the second incarnation number is higher than the first incarnation number.

3. The method of claim 2 wherein said retrieving the first incarnation number comprises using remote direct memory access (RDMA).

4. The method of claim 1 wherein said retrieving comprises using RDMA.

5. The method of claim 1 further comprising:
detecting a plurality of change entries in a plurality of redo buffers in the first persistent storage, wherein each change entry of the plurality of change entries contains a sequence number that comprises a timestamp or a system change number (SCN);
determining a global order for the plurality of change entries based on the sequence numbers in the plurality of change entries;
appending the plurality of change entries onto the online redo log in said global order.

6. The method of claim 5 further comprising scanning the plurality of change entries including detecting, in exactly one iteration of a sequence of iterations, said change entry has a lowest sequence number.

7. The method of claim 1 wherein said retrieving comprises a first network element retrieving from a second network element that is connected to the first network element by a rack backplane.

8. The method of claim 1 wherein said retrieving does not entail input output waiting (IOWAIT).

9. The method of claim 1 wherein:

the second persistent storage is a solid state drive (SSD) or the first persistent storage is an SSD.

10. One or more computer-readable non-transitory media storing instructions that, when executed by one or more processors, cause:

detecting that a change entry is contained in a first persistent storage and an online redo log in a second persistent storage that is slower than the first persistent storage;

deciding, based on said detecting, not to retrieve the change entry from the first persistent storage;

retrieving a second change entry from the first persistent storage;

appending, after said retrieving the second change entry, the second change entry onto the online redo log;

applying, to a persistent database block, the second change entry from the online redo log.

11. The one or more computer-readable non-transitory media of claim 10 wherein the instructions further cause:

retrieving a first incarnation number from the first persistent storage in a first computer;

retrieving a second incarnation number from the first persistent storage in a second computer;

detecting that the second incarnation number is higher than the first incarnation number;

wherein said retrieving the change entry is based on said detecting that the second incarnation number is higher than the first incarnation number.

12. The one or more computer-readable non-transitory media of claim 11 wherein said retrieving the first incarnation number comprises using remote direct memory access (RDMA).

13. The one or more computer-readable non-transitory media of claim 10 wherein said retrieving comprises using RDMA.

14. The one or more computer-readable non-transitory media of claim 10 wherein the instructions further cause:

detecting a plurality of change entries in a plurality of redo buffers in the first persistent storage, wherein each change entry of the plurality of change entries contains a sequence number that comprises a timestamp or a system change number (SCN);

determining a global order for the plurality of change entries based on the sequence numbers in the plurality of change entries;

appending the plurality of change entries onto the online redo log in said global order.

15. The one or more computer-readable non-transitory media of claim 14 wherein the instructions further cause scanning the plurality of change entries including detecting, in exactly one iteration of a sequence of iterations, said change entry has a lowest sequence number.

16. The one or more computer-readable non-transitory media of claim 10 wherein said retrieving comprises a first network element retrieving from a second network element that is connected to the first network element by a rack backplane.

17. The one or more computer-readable non-transitory media of claim 10 wherein said retrieving does not entail input output waiting (IOWAIT).

18. The one or more computer-readable non-transitory media of claim 10 wherein:

the second persistent storage is a solid state drive (SSD) or the first persistent storage is an SSD.

\* \* \* \* \*